United States Patent
Nishimura

(10) Patent No.: US 11,679,968 B2
(45) Date of Patent: Jun. 20, 2023

(54) PRODUCT CONVEYANCE SYSTEM, PRODUCT CONVEYANCE ROBOT, AND STORAGE BOX

(71) Applicant: TOYOTA JIDOSHA KABUSHIKI KAISHA, Aichi-ken (JP)

(72) Inventor: Takashi Nishimura, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 394 days.

(21) Appl. No.: 16/935,116

(22) Filed: Jul. 21, 2020

(65) Prior Publication Data
US 2021/0114853 A1 Apr. 22, 2021

(30) Foreign Application Priority Data
Oct. 16, 2019 (JP) .............................. JP2019-189221

(51) Int. Cl.
| | |
|---|---|
| *B66F 9/06* | (2006.01) |
| *B65D 5/42* | (2006.01) |
| *B65D 5/34* | (2006.01) |
| *B66F 9/18* | (2006.01) |

(52) U.S. Cl.
CPC .............. *B66F 9/063* (2013.01); *B65D 5/325* (2013.01); *B65D 5/4208* (2013.01); *B66F 9/18* (2013.01)

(58) Field of Classification Search
None
See application file for complete search history.

(56) References Cited

U.S. PATENT DOCUMENTS

| | | | | |
|---|---|---|---|---|
| 10,647,559 | B2* | 5/2020 | Schwarz | .................... B66F 9/12 |
| 10,909,648 | B2* | 2/2021 | Ibe | .......................... G06Q 50/28 |
| 11,338,430 | B2* | 5/2022 | Kato | ........................ B61B 13/00 |
| 2018/0327237 | A1 | 11/2018 | Sibley | |
| 2020/0254607 | A1* | 8/2020 | Ejstrup Hansen | ..... B25J 11/008 |
| 2020/0393854 | A1* | 12/2020 | Romanucci | .......... G05D 1/0088 |
| 2023/0005162 | A1* | 1/2023 | Nakano | ................... G06T 7/579 |

FOREIGN PATENT DOCUMENTS

| | | |
|---|---|---|
| CN | 106586169 A | 4/2017 |
| CN | 109584469 A | 4/2019 |
| CN | 209258886 U | 8/2019 |
| EP | 2962605 A1 | 1/2016 |
| JP | 2007118958 A | 5/2007 |
| JP | 6336235 B1 | 6/2018 |

* cited by examiner

*Primary Examiner* — Mark C Hageman
(74) *Attorney, Agent, or Firm* — Hauptman Ham, LLP

(57) ABSTRACT

A product conveyance system includes: a storage box in which a product is stored; and a product conveyance robot including a travel portion and a holding portion provided above the travel portion and configured to hold the storage box. The holding portion includes a pair of support columns provided in a standing manner with an interval between the support columns in the width direction. Each of the support columns includes: one or more support rails configured to support the storage box in the height direction, the storage box being placed between the support columns; and one or more lock pins provided on a facing surface of the each of the support columns, the facing surface facing the other one of the support columns, the one or more lock pins being configured to protrude and retract in the width direction.

4 Claims, 16 Drawing Sheets

FIG. 11
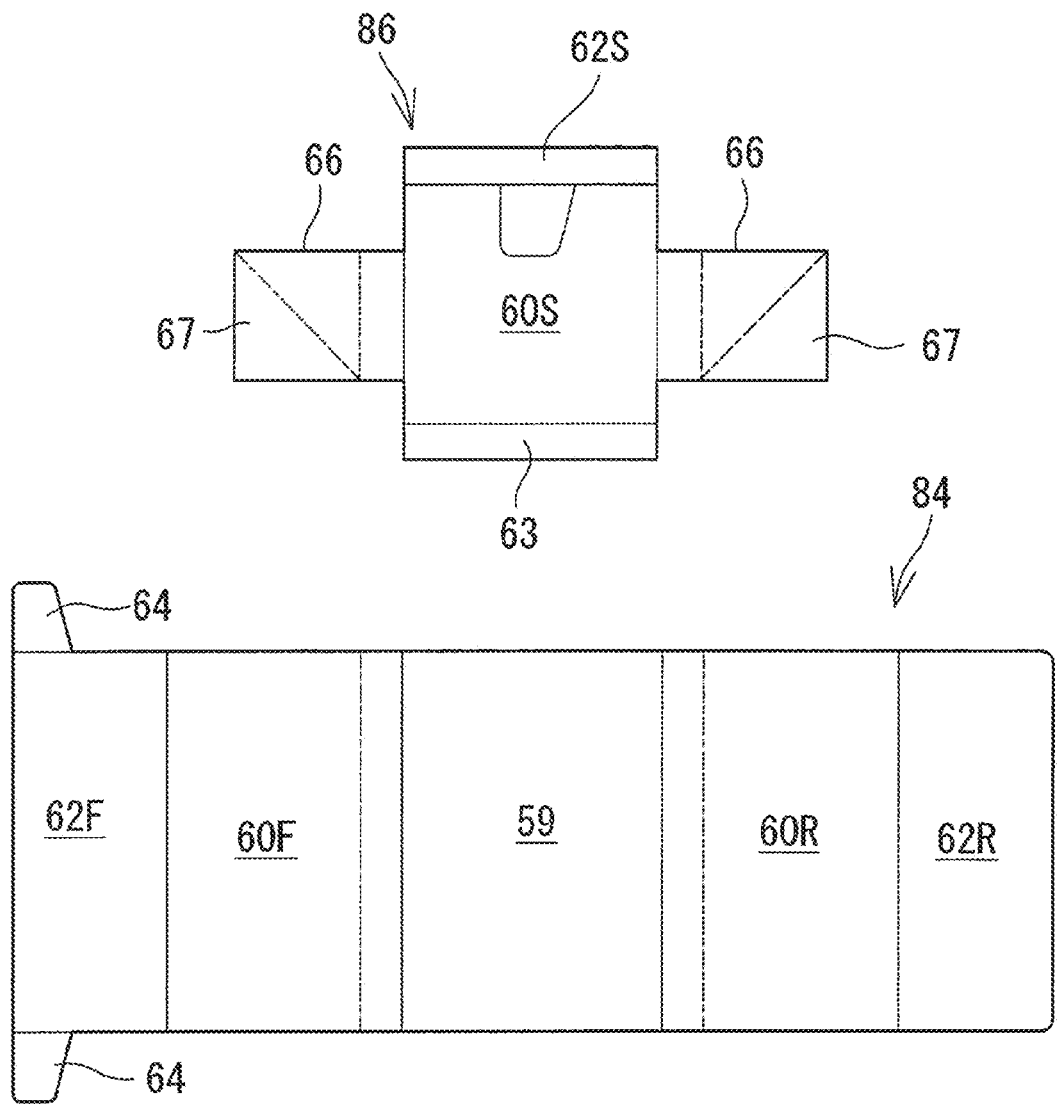
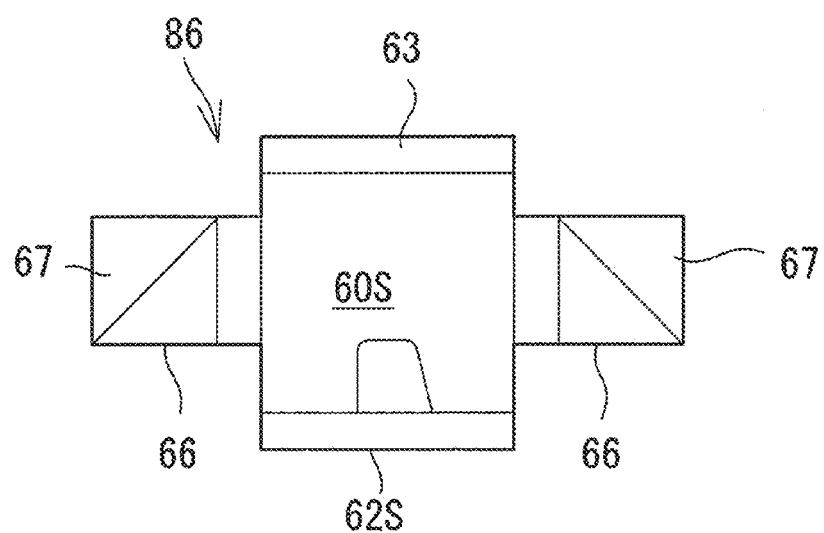

FIG. 16
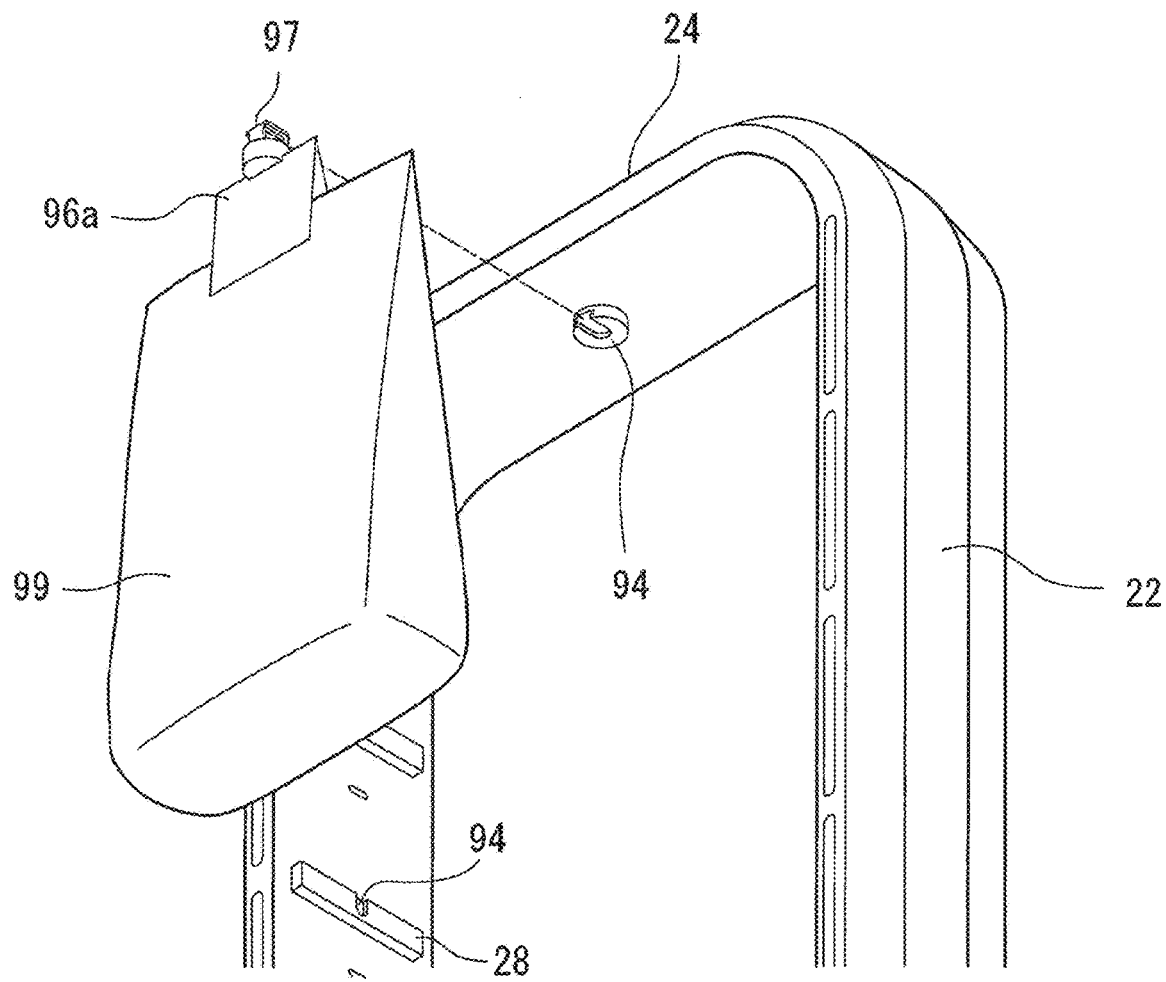
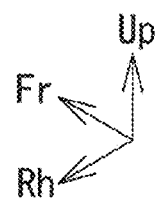

PRODUCT CONVEYANCE SYSTEM, PRODUCT CONVEYANCE ROBOT, AND STORAGE BOX

INCORPORATION BY REFERENCE

The disclosure of Japanese Patent Application No. 2019-189221 filed on Oct. 16, 2019 including the specification, drawings and abstract is incorporated herein by reference in its entirety.

BACKGROUND

1. Technical Field

The present specification describes a product conveyance robot configured to convey a product by an autonomously mobile robot, a storage box in which a product is stored, and a product conveyance system including them.

2. Description of Related Art

In recent years, there have been proposed product conveyance robots configured to convey a product by use of an autonomously mobile robot. Most of the product conveyance robots include a solid container, and a product or a storage box in which a product is stored is stored in the container. By storing the storage box or the like in the solid container as such, it is possible to prevent fall and theft of the storage box or the like in the course of conveyance. However, in a case where the container is provided, such a problem is caused that the robot is upsized just by the size of the container.

Japanese Patent No. 6336235 (JP 6336235 B) describes a product conveyance robot configured to convey a product while the product is exposed to outside. More specifically, the product conveyance robot of JP 6336235 B includes a travel portion and a square ring-shaped body portion. A basket, a box, or a tray in which the product is stored or placed is attached in an attachable and detachable manner to an opening penetrating through the body portion. In a case of such a configuration, a large container is unnecessary, so that the size of the product conveyance robot can be reduced.

SUMMARY

However, the product conveyance robot of JP 6336235 B assumes only a case where the product is conveyed in a small area that can be monitored by an administrator and does not consider any measures against fall or theft of the product. Accordingly, the product conveyance robot of JP 6336235 B cannot be applied to product conveyance in a large area that cannot be monitored by the administrator.

In view of this, the present specification describes a conveyance system that can prevent fall and theft of a target product for conveyance while upsizing of a product conveyance robot is avoided, and a product conveyance robot and a storage box used for the conveyance system.

A product conveyance system described in the present specification includes a storage box and a product conveyance robot. The storage box is a storage box in which a product is stored. The product conveyance robot includes a travel portion and a holding portion provided above the travel portion and configured to hold the storage box. The holding portion includes a pair of support columns provided in a standing manner with an interval between the support columns in the width direction. Each of the support columns includes: one or more supports configured to support the storage box in a height direction, the storage box being placed between the support columns; and one or more lock pins provided on a facing surface of the each of the support columns, the facing surface facing the other one of the support columns, the one or more lock pins being configured to protrude and retract in the width direction, the one or more lock pins being configured to engage with a part of the storage box supported by the supports when the one or more lock pins protrude from the facing surface.

In this case, the product conveyance robot conveys the storage box in a state where the storage box is exposed to outside. In other words, a container or the like in which the storage box is completely stored is unnecessary, so that the size of the product conveyance robot can be reduced. Further, since the product conveyance robot includes the lock pins configured to engage with the storage box supported by the supports, fall and theft of the storage box can be effectively prevented even in a state where the storage box is exposed to outside. As a result, it is possible to prevent fall and theft of a target product for conveyance while upsizing of the product conveyance robot is avoided.

In this case, the storage box may include a bottom wall, a peripheral wall provided in a standing manner from a periphery of the bottom wall, a cover configured to cover a takeout opening from above, the takeout opening being an upper end opening of the peripheral wall, and ear portions hanging downward from both ends of the cover in the width direction. Engageable recessed portions with each of which a corresponding one of the lock pins engages may be formed in the ear portions.

When the ear portions engage with the lock pins, movement of the cover connected to the ear portions is restricted. As a result, the cover is prevented from being opened, so that removal of the product from the storage box can be prevented.

The supports may be support rails provided on the facing surfaces of the support columns and configured to slidably support the storage box from below. The support rails may be formed on the facing surfaces at regular intervals in the height direction. The storage box may include a plurality of types of storage boxes having different height dimensions. A side recessed portion configured to avoid interference with the support rails may be formed on a side wall of the storage box having a height dimension larger than an arrangement interval between the support rails.

By providing the side recessed portion in the side wall of the storage box as needed, storage boxes in various sizes can be held by the holding portion.

The product conveyance system may further include a plurality of types of attachments configured to be freely attachable to and detachable from the holding portion, each of the attachments including a connecting portion and configured to hold an option container that is not supportable by the supports. The holding portion may be provided with one or more connected portions to which the connecting portion is connectable in a freely attachable and detachable manner. In this case, the attachments may include at least one of a hanging-type attachment configured to hold the option container in a hanging manner and a band-type attachment configured to hold the option container in a tightly binding manner.

By providing the freely attachable and detachable attachment in the holding portion, the option container that cannot be supported by the supports can be held by the product conveyance robot, and thus, multiusability of the product conveyance robot improves.

A product conveyance robot described in the present specification includes a travel portion and a holding portion. The holding portion is provided above the travel portion and configured to hold a storage box in which a product is stored, and the holding portion includes a pair of support columns provided in a standing manner with an interval between the support columns in the width direction. Each of the support columns includes: one or more supports configured to support the storage box in a height direction, the storage box being placed between the support columns; and one or more lock pins provided on a facing surface of the each of the support columns, the facing surface facing the other one of the support columns, the one or more lock pins being configured to protrude and retract in the width direction, the one or more lock pins being configured to engage with a part of the storage box supported by the supports when the one or more lock pins protrude from the facing surface.

In this case, the product conveyance robot conveys the storage box in a state where the storage box is exposed to outside. In other words, a container or the like in which the storage box is completely stored is unnecessary, so that the size of the product conveyance robot can be reduced. Further, the product conveyance robot includes the lock pins configured to engage with the storage box supported by the supports, so that fall and theft of the storage box can be effectively prevented even in a state where the storage box is exposed to outside. As a result, it is possible to prevent fall and theft of a target product for conveyance while upsizing of the product conveyance robot is avoided.

A storage box described in the present specification is a storage box in which a product is stored, the storage box being configured to be held by a product conveyance robot. The storage box includes: a bottom wall, a peripheral wall, a cover, ear portions, and engageable recessed portions. The peripheral wall is provided in a standing manner from the bottom wall. The cover is configured to cover a takeout opening from above, the takeout opening being an upper end opening of the peripheral wall. The ear portions hang downward from both ends of the cover in the width direction. The engageable recessed portions are formed at least in the ear portions, each of the engageable recessed portions being configured such that a corresponding one of lock pins provided in the product conveyance robot engages with the each of the engageable recessed portions.

When the ear portions engage with the lock pins, movement of the cover connected to the ear portions is restricted. As a result, the cover is prevented from being opened, so that removal of the product from the storage box can be prevented.

In this case, the storage box may be changeable between an assembled posture and a folded posture, the assembled posture being a posture in which the peripheral wall stands at a right angle from the bottom wall, the folded posture being a posture in which at least part of the peripheral wall and the cover are parallel to the bottom wall. A plane size of the storage box in the folded posture may be the same as a plane size of the storage box in the assembled posture. At least part of the peripheral wall may be sandwiched between the cover and the ear portions in the folded posture.

When the plane size of the storage box in the folded posture is the same as the plane size of the storage box in the assembled posture, the storage box in the folded posture can be also easily held by the product conveyance robot. Further, in the folded posture, when at least part of the peripheral wall is sandwiched between the cover and the ear portions, the folded posture can be easily maintained.

The storage box may further include a transmitter configured to output a position tracking signal detectable by an external device.

With such a configuration, the position of the storage box can be specified, so that the storage box can be surely collected. The storage box thus collected is used repeatedly, so that a resource can be effectively used.

With the product conveyance system, the product conveyance robot. and the storage box described in the present specification, it is possible to prevent fall and theft of a target product for conveyance while upsizing of the product conveyance robot is avoided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is an exploded view of the storage box;

FIG. 16 is a perspective view illustrating a state where a hanging-type attachment is attached to the holding portion.

DETAILED DESCRIPTION OF EMBODIMENTS

Figure 1:
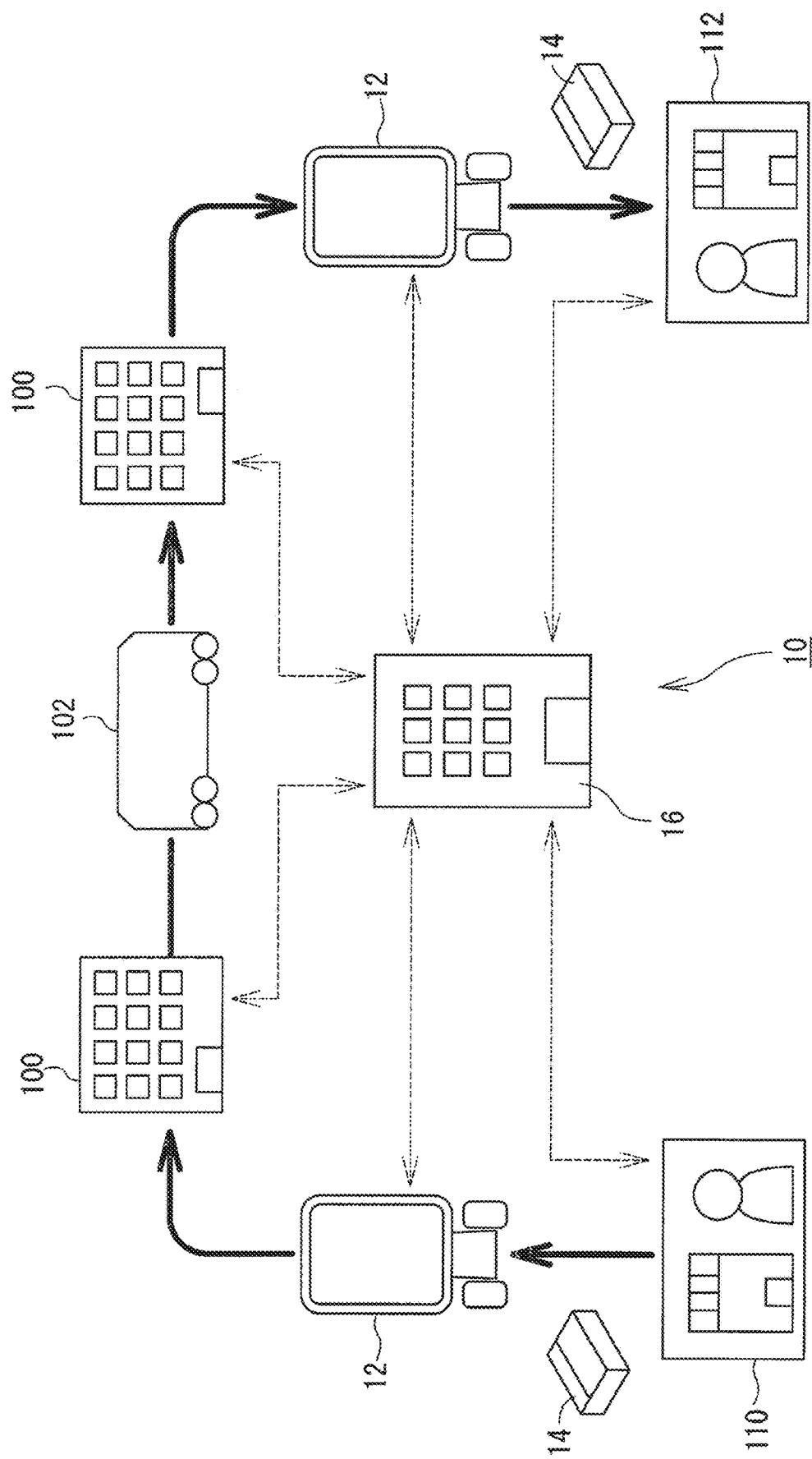
FIG. 1 is a view illustrating an exemplary configuration of a whole product conveyance system.

With reference to drawings, the following describes a configuration of a product conveyance system 10. FIG. 1 is a view illustrating an exemplary configuration of the whole product conveyance system 10. The product conveyance system 10 includes: a storage box 14 in which a product is stored; a product conveyance robot 12 configured to convey the storage box 14; and a management center 16 configured to control an operation of the product conveyance robot 12. The product conveyance robot 12 is a mobile robot that can hold the storage box 14 and autonomously move on a general road and an indoor passage. Further, the storage box 14 is a box prepared in advance in accordance with the form of the product conveyance robot 12. As will be described later, the storage box 14 is lent to an individual or a company as a delivery source 110, and after a product is delivered, the storage box 14 is collected from a delivery destination 112 and is reused.

In an example illustrated herein, the product conveyance robot 12 conveys a product from the delivery source 110 to a relay point 100 or from the relay point 100 to the delivery destination 112. More specifically, the management center 16 receives a request of product conveyance from an individual or a company as the delivery source 110 or from the relay point 100 of logistics. Such a conveyance request is sent by communication via the Internet, for example. Upon receipt of the conveyance request, the management center 16 moves the product conveyance robot 12 to the delivery source 110. The product conveyance robot 12 receives, at the delivery source 110, the storage box 14 in which a product is stored and conveys it to the relay point 100 nearest from the delivery source 110.

The storage box 14 is transported from the relay point 100 nearest from the delivery source 110 to the relay point 100 nearest from the delivery destination 112 by use of a general logistic system using a transport truck 102 or the like. The storage box 14 is conveyed again from the relay point 100 nearest from the delivery destination 112 to the delivery destination 112 by use of the product conveyance robot 12. At this time, the management center 16 may receive a request such as a delivery request time from the relay point 100 or the individual or the company as the delivery destination 112. Based on an instruction from the management center 16, the product conveyance robot 12 conveys the storage box 14 in which the product is stored from the relay point 100 to the delivery destination 112. When the product is taken out of the storage box 14 at the delivery destination 112, the product conveyance robot 12 collects the empty storage box 14.

Note that the usage mode of the product conveyance system 10 as described herein is just an example, and may be changed appropriately. For example, in the abovementioned example, the storage box 14 is delivered to the delivery destination 112 via the relay point 100. However, the product conveyance robot 12 may directly convey the product received from the delivery source 110 to the delivery destination 112 without going through the relay point 100. Further, in the above example, the storage box 14 is "lent" to the delivery source 110, but the delivery source 110 may purchase the storage box 14.

Figure 2:
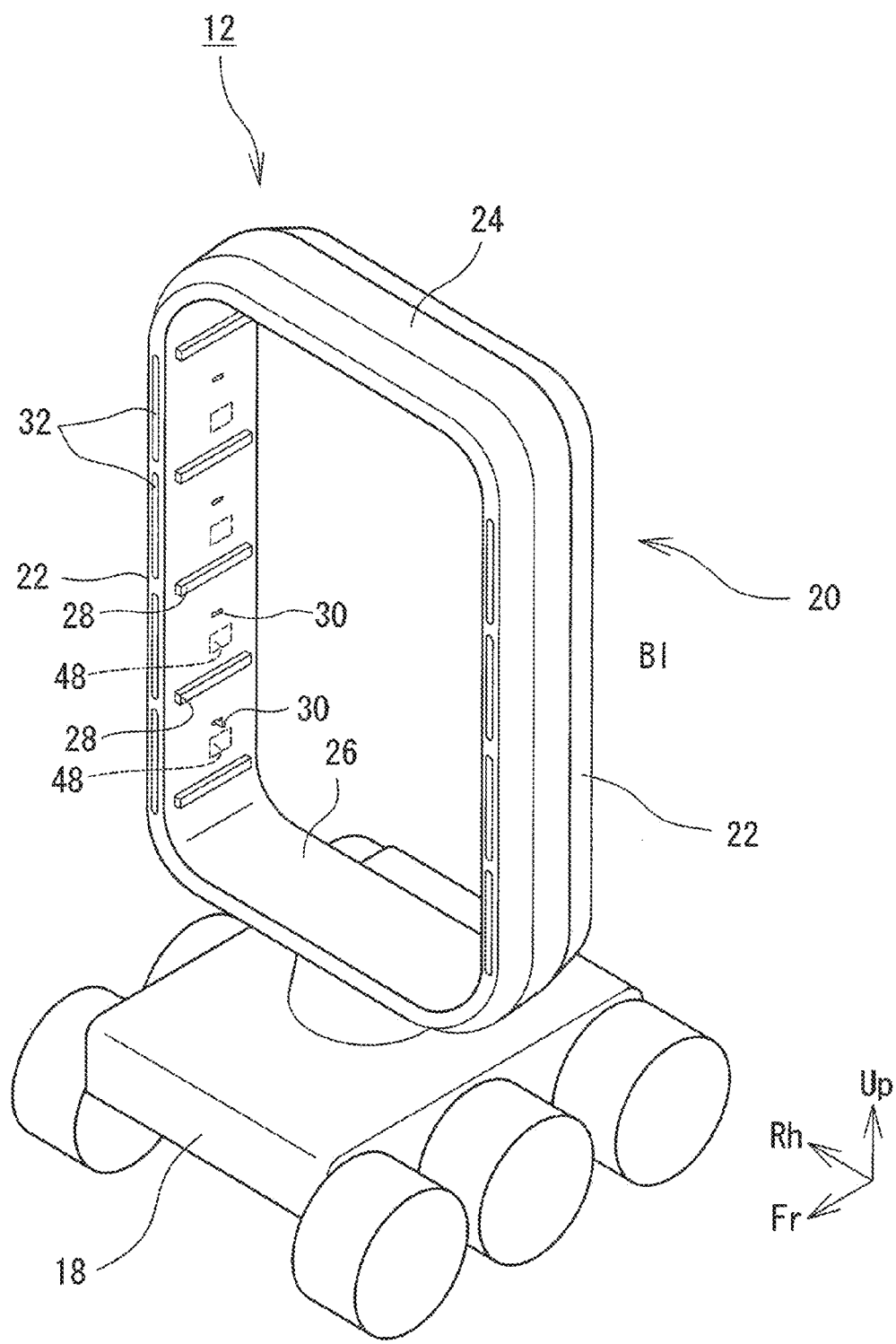
FIG. 2 is a perspective view of a product conveyance robot.
Figure 3:
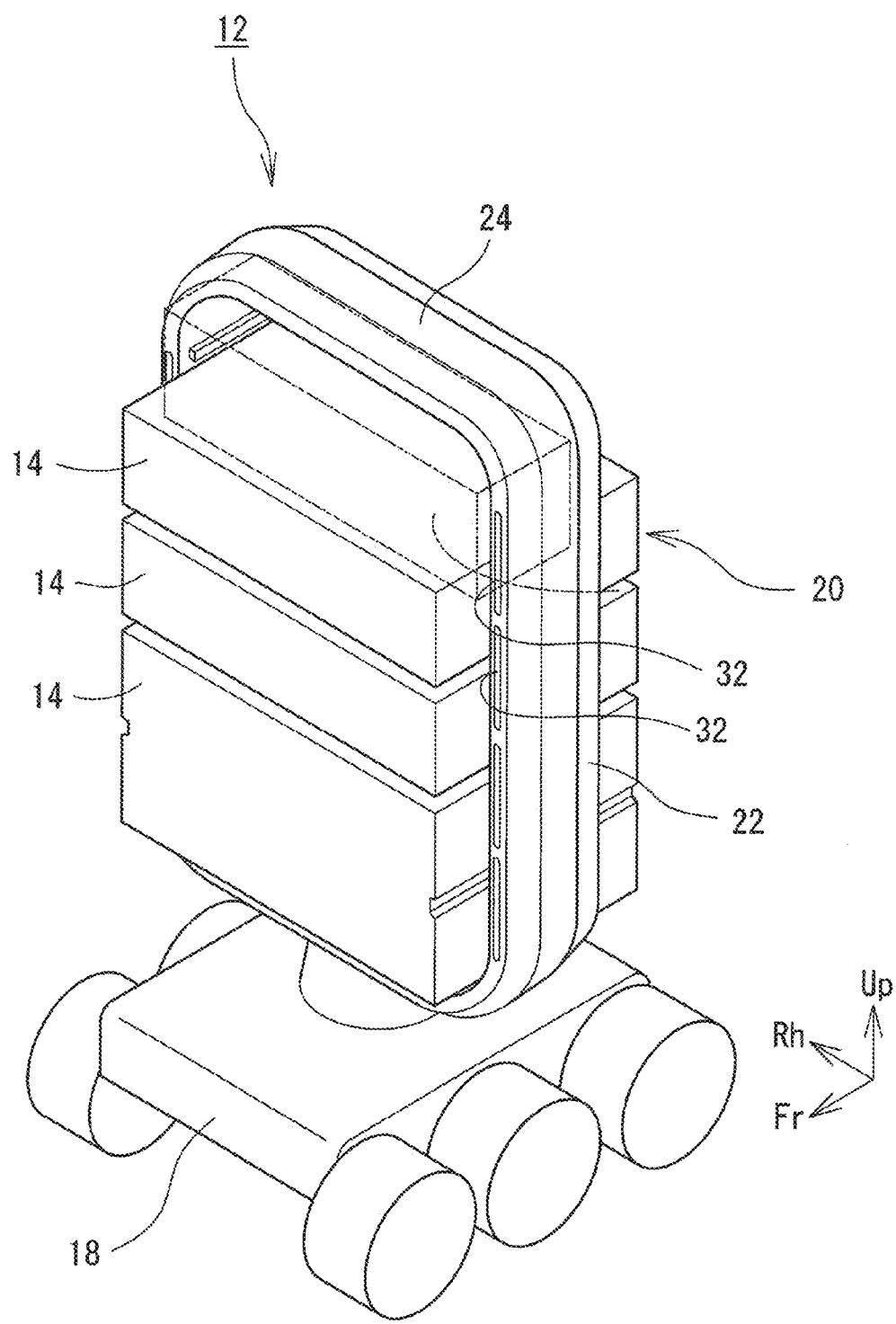
FIG. 3 is a perspective view of the product conveyance robot in a state where a storage box is held.
Figure 4:
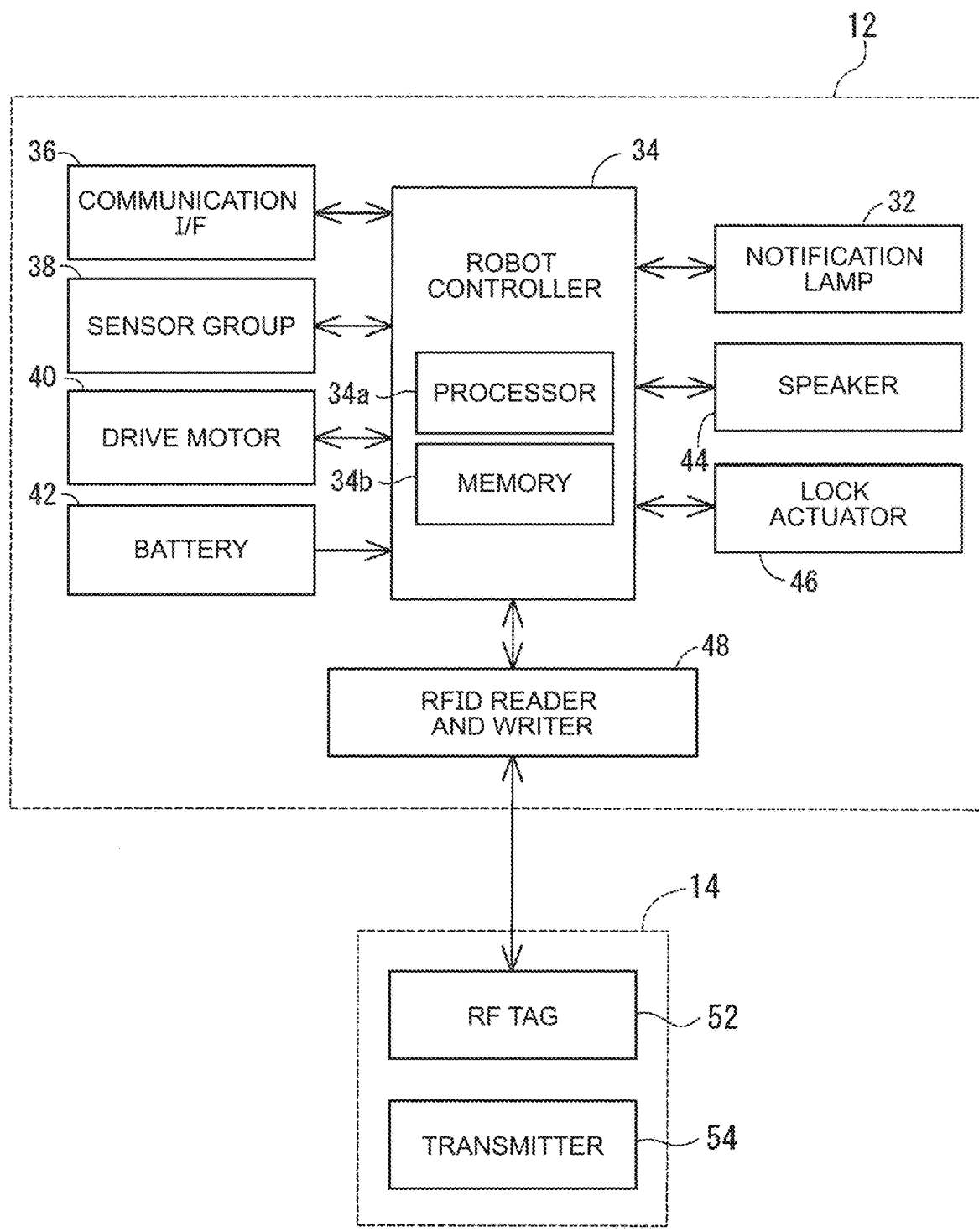
FIG. 4 is a block diagram illustrating an electrical configuration of the product conveyance robot and the storage box.

Next will be described the product conveyance robot 12 and the storage box 14 constituting the product conveyance system 10 with reference to FIGS. 2 to 4. FIG. 2 is a perspective view of the product conveyance robot 12, and FIG. 3 is a perspective view of the product conveyance robot 12 in a state where the storage box 14 is held. Further, FIG. 4 is a block diagram illustrating an electrical configuration of the product conveyance robot 12 and the storage box 14. Note that, in each of the following figures, "Fr," "Up," and "Rh" indicate a front side, an upper side, and a right side of the product conveyance robot 12, respectively.

Mechanically, the product conveyance robot 12 is roughly divided into a travel portion 18 including wheels and so on, and a holding portion 20 provided above the travel portion 18. As illustrated in FIGS. 2, 3, the travel portion 18 includes three wheels on each side, that is, six wheels in total (three wheels on the right side and three wheels on the left side). A drive motor 40 (not shown in FIGS. 2, 3, see FIG. 4) configured to rotationally drive the six wheels is provided in the product conveyance robot 12. The drive motor 40 may be provided for each wheel or may be provided for only some of the wheels. Note that the configuration of the travel portion 18 may be changed appropriately, provided that the travel portion 18 can travel on a general road or an indoor passage. For example, the number of wheels is not limited to six and may be four or more than six. Further, instead of the wheels, other travel mechanisms, e.g., an endless track that is known as a brand name such as caterpillar, may be provided.

Further, the product conveyance robot 12 is also provided with a communication I/F 36 and a sensor group 38 (not shown in FIGS. 2, 3, see FIG. 4) in order to assist autonomous movement by the travel portion 18. The communication I/F 36 is configured to communicate with an external device and includes hardware for mobile data communication using a line provided by a mobile phone carrier or the like or middle-distance or short-distance wireless communication using Bluetooth (registered trademark) or the like. The external device as a communication counterpart includes, for example, a communication terminal provided in the management center 16, the relay point 100, or the like, a mobile communication terminal owned by an individual, other product conveyance robots 12, and so on. The product conveyance robot 12 acquires various pieces of information related to product conveyance, e.g., destination information, a traffic condition, and so on, via the communication I/F 36. Further, the product conveyance robot 12 transmits necessary information, e.g., a product conveyance state or the like to the management center 16 or the like via the communication I/F 36.

The sensor group 38 includes one or more sensors configured to detect a travel state of the product conveyance robot 12 and a surrounding environment. Such a sensor group 38 includes, for example, at least one of a speed sensor, a camera, a millimeter wave radar, an infrared sensor, LiDAR, an ultrasonic sensor, a GPS sensor, an acceleration sensor, and a gyro sensor. A robot controller 34 (see FIG. 4) described later drives the drive motor 40 based on a detection result detected by the sensor group 38 and information acquired via the communication I/F 36.

The holding portion 20 is provided above the travel portion 18 and holds the storage box 14 in a specified size. As illustrated in FIG. 2, the holding portion 20 has a square ring shape and includes: a pair of support columns 22 standing with an interval being provided therebetween in the width direction; an upper lateral member 24 connecting upper ends of the support columns 22 to each other; and a lower lateral member 26 connecting lower ends of the support columns 22 to each other. Accordingly, both ends of the holding portion 20 in the depth direction are penetrated without being closed. As illustrated in FIG. 3, the storage box 14 is placed and held in a penetrated part of the holding portion 20. Note that, as will be described later more specifically, the depth dimension of the storage box 14 is sufficiently larger than the depth dimension of the holding portion 20 as apparent from FIG. 3. On this account, in a case where the storage box 14 is placed in the holding portion 20, a front part and a rear part of the storage box 14 project from a front end and a rear end of the holding portion 20 so as to be exposed to outside.

Each of facing surfaces of the support columns 22 is provided with a plurality of (five in the example illustrated herein) support rails 28 such that the support rails 28 are provided at intervals in the height direction. The support rail 28 functions as a support that slidably supports the storage box 14 from below. An internal space of a square ring as the holding portion 20 is divided into four areas in the height direction by the five support rails 28. In the following description, the four areas thus divided in the height direction are each referred to as a "block B1."

Each of the facing surfaces of the support columns 22 is further provided with lock pins 30. One lock pin 30 is provided on each of the right and left sides of one block B1, that is, two lock pins 30 in total are provided in one block B1. Each lock pin 30 can protrude and retract in the width direction, and when the lock pin 30 protrudes, the lock pin 30 engages with a part of the storage box 14. Note that, in FIG. 2, only the lock pin 30 on the lowermost side protrudes, and the other lock pins 30 retract. When the lock pin 30 engages with the storage box 14, it is possible to prevent fall and theft of the storage box 14, but this will be described later.

A lock actuator 46 (see FIG. 4) configured to cause the lock pin 30 to protrude and retract is provided in the product conveyance robot 12. The configuration of the lock actuator 46 is not limited particularly, provided that the lock actuator 46 can be electronically controlled. Accordingly, the lock actuator 46 may be an electromagnetic cylinder such as a solenoid actuator. Further, the lock actuator 46 may be an actuator including a pneumatic cylinder, a hydraulic cylinder, a linear motor, and the like. Further, the lock actuator 46 may be an actuator configured by combining a rotary motor and a transmission mechanism. The lock actuator 46 may be configured such that, when no current is applied, the lock actuator 46 protrudes the lock pin 30, and when a current is applied, the lock actuator 46 retracts the lock pin 30. With such a configuration, even when there is no power source, the lock pin 30 can be protruded, so that the storage box 14 can be prevented from being stolen.

An RFID reader and writer 48 is also provided on the facing surface of the support column 22. Further, an RF tag 52 (see FIG. 4) is fixed to a part of a side wall 60S of the storage box 14, the part facing the RFID reader and writer 48. The RFID reader and writer 48 stores information in the RF tag 52 and reads information stored in the RF tag 52, by use of short-distance wireless communication using an electromagnetic field, a radio wave, or the like.

Here, the information stored in the RF tag 52 may include, for example, delivery information about delivery, e.g., address information of the delivery source 110 and the delivery destination 112, delivery request time, and so on. Here, in conventional delivery, such delivery information is described in a slip attached to a surface of a box. However, as described above, the product conveyance robot 12 in the present example conveys the storage box 14 in a state where part of the storage box 14 is exposed to outside. On this account, when a slip in which delivery information is described is attached to the surface of the box, an unspecified number of people might see the delivery information in the course of conveyance. In the meantime, as described in the present example, in a case where the delivery information is stored in the RF tag 52, even if part of the storage box 14 is exposed to outside, people around the storage box 14 cannot grasp the delivery information. Note that, in a case where the RF tag 52 is provided, such a problem is caused that a cost increases. However, the storage box 14 in the present example is used repeatedly, and therefore, an increase in cost per one delivery along with addition of the RF tag 52 can be restrained to be small.

Note that the present embodiment deals with an example in which delivery information is stored in the RF tag 52. However, delivery information may be stored in other forms, provided that irrelative people cannot easily recognize the delivery information. For example, instead of the RF tag 52, a bar code indicative of delivery information may be attached to the storage box 14. In this case, the product conveyance robot 12 includes a bar code reader. Further, each storage box 14 may have a unique identification number, and a database in which the identification number and delivery information are stored in an associated manner may be provided in the management center 16. In this case, when delivery information of the storage box 14 is required, the product conveyance robot 12 may transmit, to the management center 16, a request of the delivery information together with the identification number of the storage box 14.

A plurality of notification lamps 32 is provided on a front face of the support column 22. One notification lamp 32 is provided on each of the right and left sides of each block B1. In the present example, there are four blocks B1, and therefore, eight notification lamps 32 are provided in total, i.e., four notification lams 32 are provided on each of the right and left sides. The notification lamp 32 includes a light source such as an LED, for example. By selectively lighting the notification lamps 32, the block B1 to be noticeable can be presented to a user. For example, at the time when the storage box 14 is received from the delivery source 110, the notification lamps 32 corresponding to the block B1 in which the storage box 14 can be stored are turned on, so that the user can recognize a position to which the storage box 14 is inserted. Further, at the time when the storage box 14 is delivered to the delivery destination 112, the notification lamps 32 corresponding to the block B1 in which the storage box 14 is stored are turned on, so that the user can recognize the storage box 14 that the user should take out.

Further, the product conveyance robot 12 is also provided with a speaker 44 (see FIG. 4). The speaker 44 is provided to present information to people around the product conveyance robot 12. Accordingly, the speaker 44 outputs, for example, guidance voice indicative of an operation procedure to the user at the delivery destination 112 or the delivery source 110 or voice to alert people around the product conveyance robot 12 during travel.

The product conveyance robot 12 is also provided with a battery 42 (see FIG. 4) configured to supply electric power to various electric devices provided in the product conveyance robot 12. The battery 42 is freely attachable to and detachable from the product conveyance robot 12 and is charged outside the product conveyance robot 12 as needed.

Driving of the product conveyance robot 12 is controlled by the robot controller 34 (see FIG. 4). The robot controller 34 is a microcomputer including at least a processor 34*a* and a memory 34*b*. Each function of the robot controller 34 is implemented such that the processor 34*a* executes a program stored in the memory 34*b*. Note that the processor 34*a* indicates a processor in a general sense and includes a general-purpose processor (e.g., a central processing unit (CPU) or the like) or a single-purpose processor (e.g., a graphic processing unit (GPU), an application specific integrated circuit (ASIC), a field programmable gate array (FPGA), a programmable logical device, or the like). Further, it is not necessary that the processor 34*a* constituting the robot controller 34 be physically one processor, and the robot controller 34 may be constituted by a plurality of processors present at positions physically distanced from each other. Similarly, it is not necessary that the memory 34b be physically one element, and the memory 34b may be constituted by a plurality of memories present at positions physically distanced from each other. Further, the memory may include at least one of a semiconductor memory (e.g., a RAM, a ROM, a solid state drive, or the like) and a magnetic disk (e.g., a hard disk drive or the like).

The storage box 14 is a box in which a product is stored and is a box that can be held by the holding portion 20 of the product conveyance robot 12. As described above, the storage box 14 is assumed to be used repeatedly and has a relatively solid configuration. In the present example, a plurality of different size types of storage boxes 14 with different heights is prepared. The storage box 14 in any size has the same plane size. That is, the storage box 14 in any size has a width dimension slightly smaller than an opposed distance between the support columns 22 and a depth dimension sufficiently larger than the depth dimension of the support columns 22.

Further, the height dimension of the storage box 14 is set based on an arrangement interval between the support rails 28 in the height direction, that is, the height dimension of the block B1. In the following description, a size that occupies one block is referred to as "small size" among the sizes of the storage boxes 14. Similarly, a size that occupies two blocks is referred to as "medium size," a size that occupies three blocks is referred to as "large size," and a size that occupies four blocks is referred to as "extra-large size." In an example illustrated in FIG. 3, the product conveyance robot 12 holds two storage boxes 14 in the small size and one storage box 14 in the medium size.

As described above, the RF tag 52 is fixed to such a storage box 14. Further, a transmitter 54 (see FIGS. 4, 5) is also fixed to the storage box 14. The transmitter 54 is configured to output a position tracking signal and is, for example, a GPS transmitter. Since the transmitter 54 is fixed to the storage box 14, a position of the storage box 14 can be tracked. That is, as described repeatedly, the storage box 14 in the present example is a rental box assumed to be used repeatedly. When the storage box 14 is not returned by the user, the position of the storage box 14 may be specified based on a position tracking signal from the transmitter 54, and the product conveyance robot 12 may be sent to the storage box 14 so as to request the user to return the storage box 14. Note that the transmitter 54 includes a battery configured to supply driving electric power to the transmitter 54. The battery may be a primary battery for a single use or may be a dischargeable and chargeable secondary battery. In a case where a secondary battery is provided in the transmitter 54, a wireless battery charger that can wirelessly charge the secondary battery may be provided in the product conveyance robot 12. In this case, the product conveyance robot 12 may charge the secondary battery by using a period during which the storage box 14 is held by the holding portion 20.

Figure 5:
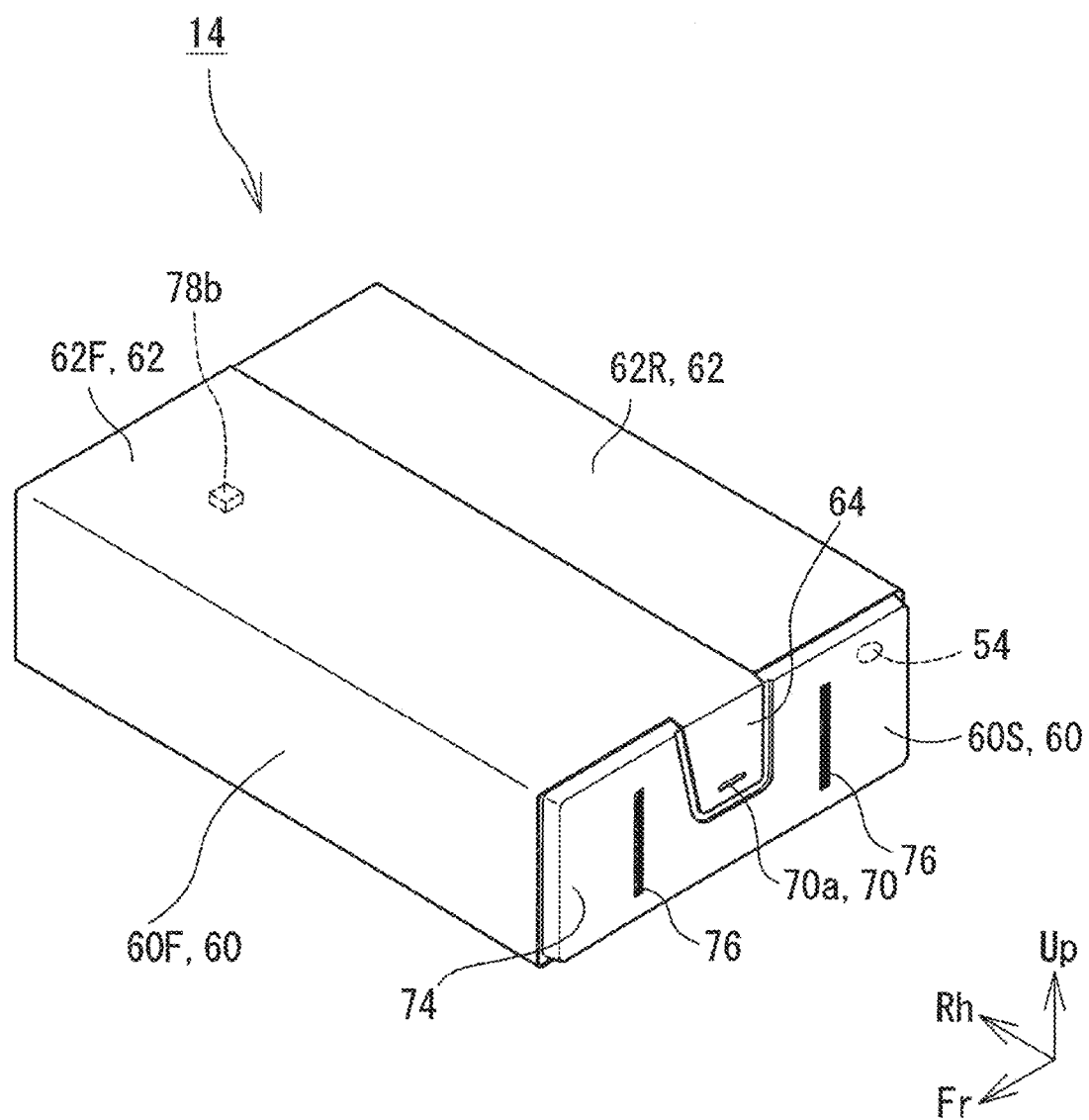
FIG. 5 is a perspective view of a storage box in a small size.
Figure 6:
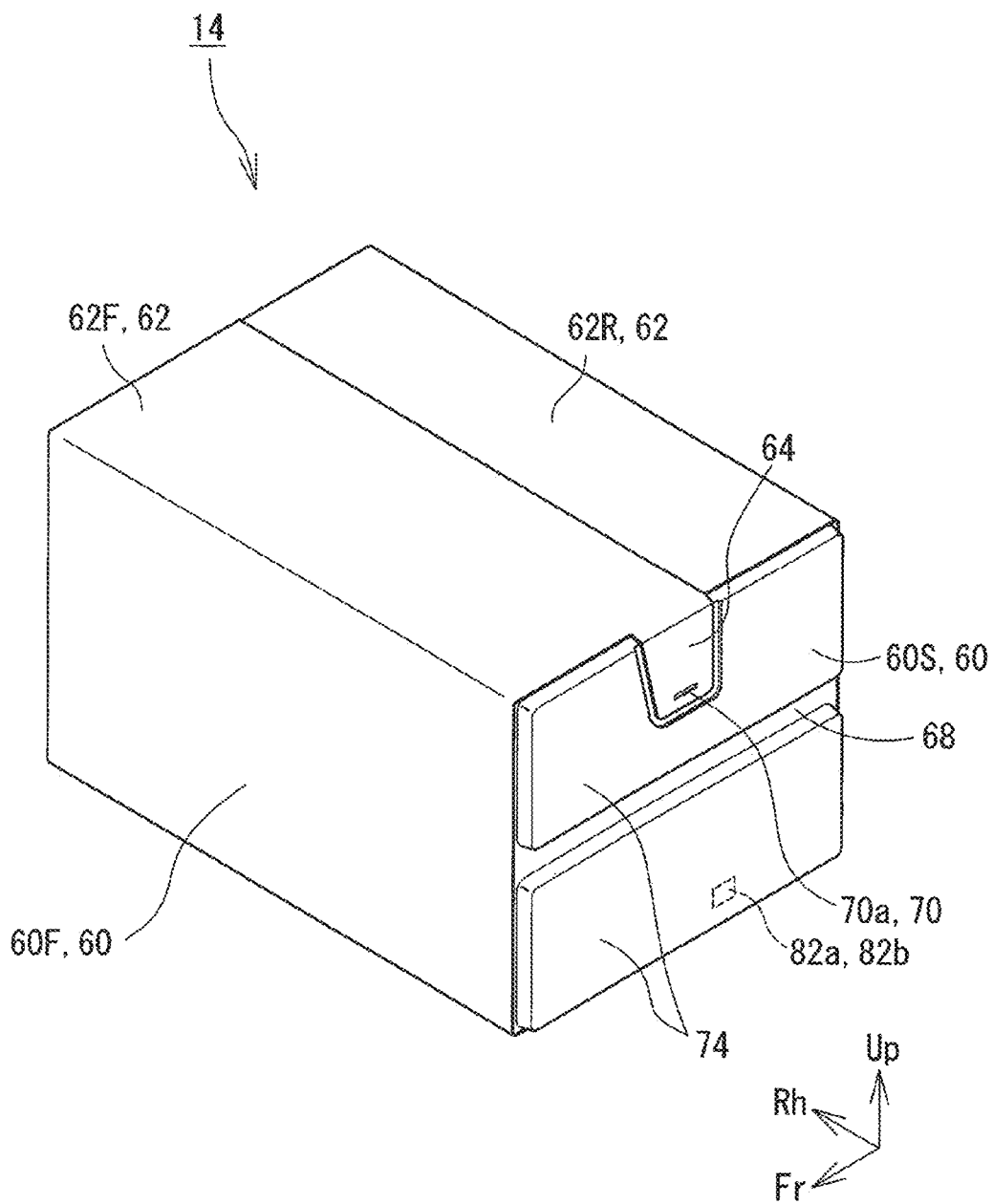
FIG. 6 is a perspective view of a storage box in a medium size.
Figure 7:
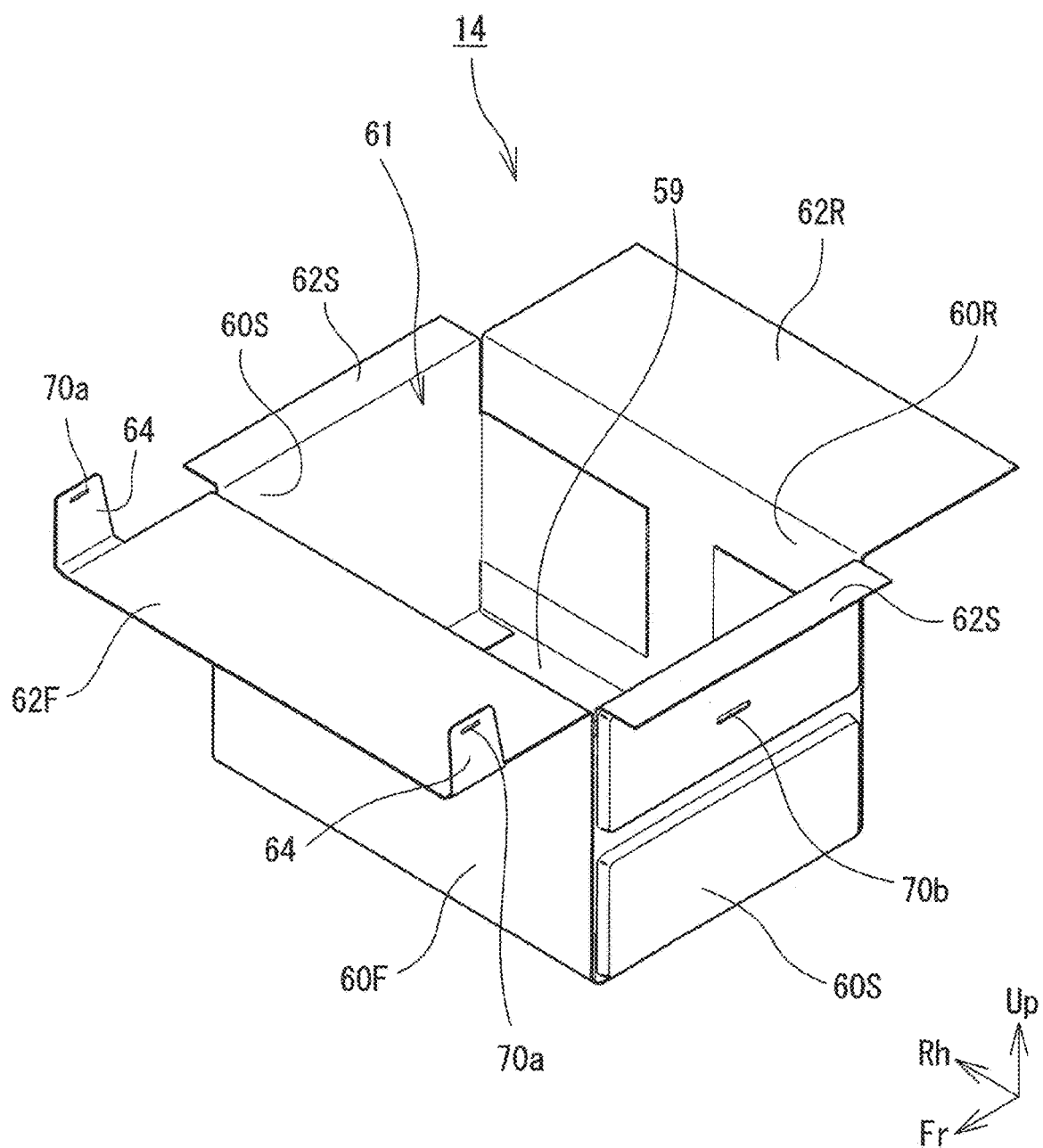
FIG. 7 is a perspective view of the storage box in the medium size in a state where a cover is opened.

Next will be described a mechanical configuration of the storage box 14 with reference to FIGS. 5 to 7. FIG. 5 is a perspective view of the storage box 14 in the small size, and FIG. 6 is a perspective view of the storage box 14 in the medium size. Further, FIG. 7 is a perspective view of the storage box 14 in the medium size in a state where a cover is opened.

As described above, in the present example, four types of storage boxes 14 in the small size, the medium size, the large size, and the extra-large size are provided. The storage boxes 14 have the same plane size and only have different height dimensions. The height dimension of the storage box 14 is generally the same as an integral multiple of the height dimension of one block (eventually, the arrangement interval between the support rails 28), or a value obtained by subtracting the height dimension of the support rail 28 from an integral multiple of the height dimension of one block.

The following describes the configuration of the storage box 14 by mainly taking the storage box 14 in the medium size as an example. The storage box 14 includes a bottom wall 59 (not visible in FIGS. 5, 6) and a peripheral wall 60 standing from the bottom wall 59. The peripheral wall 60 includes a front wall 60F, a rear wall 60R (not visible in FIGS. 5, 6), and a pair of side walls 60S. Among them, the side walls 60S have a thick wall portion 74 thicker than the front wall 60F and the rear wall 60R. An upper end opening of the peripheral wall 60 serves as a takeout opening 61 (see FIG. 7) via which a product is put in and out. In a case of the storage box 14 in the medium size or larger size, a side recessed portion 68 to avoid interference with the support rail 28 is formed in the thick wall portion 74. The side recessed portion 68 is formed in a part distanced from a bottom face of the storage box 14 only by an integral multiple of the arrangement interval between the support rails 28.

The takeout opening 61 is covered from above with a cover 62 constituted by a plurality of cover flaps 62F, 62R, 62S. A front cover flap 62F, a rear cover flap 62R, and a pair of side cover flaps 62S are flaps connected to upper ends of the front wall 60F, the rear wall 60R, and the side walls 60S, respectively. When the storage box 14 is closed, the side cover flaps 62S are folded inwardly at an angle of 90 degrees from the side walls 60S. Subsequently, the rear cover flap 62R is folded inwardly at an angle of 90 degrees from the rear wall 60R, and finally, the front cover flap 62F is folded inwardly at an angle of 90 degrees from the front wall 60F. At this time, a distal end of the front cover flap 62F is placed rearward from a distal end of the rear cover flap 62R so that an overlap portion is formed between the front cover flap 62F and the rear cover flap 62R.

Ear flaps 64 are connected to both sides of the front cover flap 62F in the width direction. As illustrated in FIGS. 5, 6, the ear flaps 64 are flaps hanging down outside the side walls 60S from both ends of the front cover flap 62F in the width direction when the cover of the storage box 14 is closed. The ear flaps 64 each have a through-hole 70a that is an elongated hole elongated in the front-rear direction. Further, a recessed portion 70b that is elongated in the front-rear direction is formed in a part of the thick wall portion 74 of the side wall 60S, the part directly facing the through-hole 70a. The through-hole 70a and the recessed portion 70b serve as an engageable recessed portion 70 into which the lock pin 30 is inserted in an engageable manner. This will be described with reference to FIG. 8.

Figure 8:
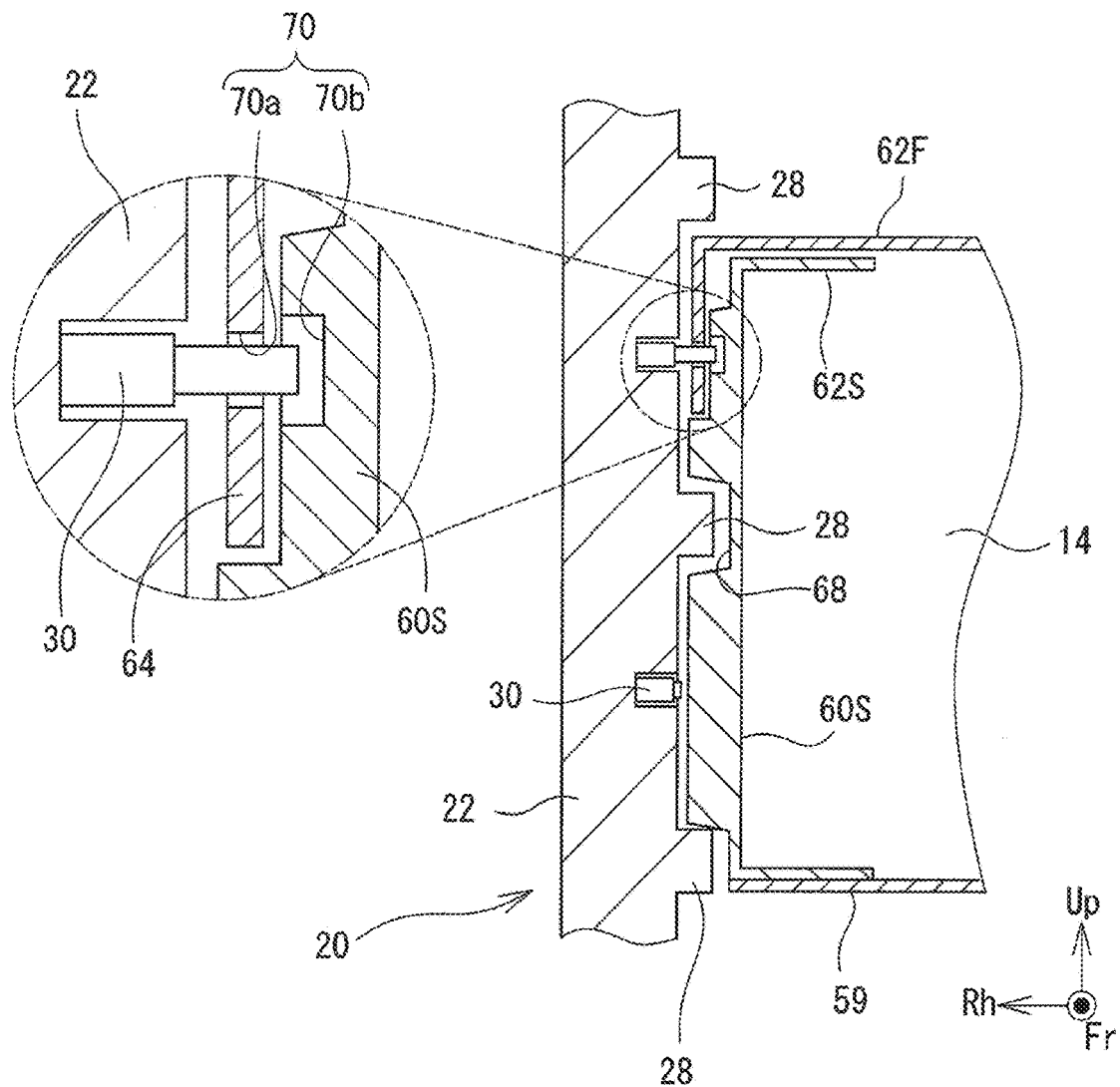
FIG. 8 is a schematic longitudinal sectional view around an engageable recessed portion in a state where the storage box is set in a holding portion.

FIG. 8 is a schematic longitudinal sectional view around the engageable recessed portion 70 in a state where the storage box 14 is set in the holding portion 20. As illustrated in FIG. 8, and also as described above, the takeout opening 61 of the storage box 14 is covered from above with the cover 62 including the front cover flap 62F. In a case where the storage box 14 is set in the holding portion 20, the user places the storage box 14 on the support rail 28 and slides the storage box 14 along the support rail 28 to a position where the engageable recessed portion 70 of the ear flap 64 and the side wall 60S directly faces the lock pin 30 provided in the support column 22.

When this state is established, the lock pin 30 protrudes toward the storage box 14 side and enters the engageable recessed portion 70, so that the lock pin 30 engages with the ear flap 64 and the side wall 60S. This engagement hinders the storage box 14 from being detached from the holding portion 20. This makes it possible to effectively prevent fall and theft of the storage box 14 from the holding portion 20. Further, the ear flap 64 where the through-hole 70a is formed is connected to the front cover flap 62F. Since movement of the ear flap 64 is restricted by the lock pin 30, an opening operation of the front cover flap 62F is also restricted. When the opening of the cover of the storage box 14 is restricted as such, removal of the product inside the storage box 14 is restricted, thereby making it possible to effectively prevent the product from being pulled out (that is, theft of the product).

Here, the reason why the lock pin 30 and the engageable recessed portion 70 are provided will be described below. As described repeatedly, in the present example, the storage box 14 is conveyed in a state where part of the storage box 14 is exposed to outside the holding portion 20 of the product conveyance robot 12. In a case of such a configuration, the storage box 14 might fall from the holding portion 20 and might be stolen from the holding portion 20 in the course of conveyance. In order to avoid such a problem, it is also conceivable that a lockable container is provided in the product conveyance robot 12, and the storage box 14 is completely stored in the container. However, in this case, the product conveyance robot 12 increases in size and weight just by the size of the container. Further, such a container is undetachable from the product conveyance robot 12, so that the size of the container cannot be changed in accordance with the magnitude of a package. In this case, in order to carry packages in various sizes, the size of the container cannot but be increased, so that space efficiency is poor. It is also conceivable that a plurality of packages is loaded in one container to improve space efficiency. However, in such a configuration, a package might be confused with another package at the delivery destination 112. That is, in a case where a container in which packages are completely stored is provided, a problem of a decrease in space efficiency and a problem of confusing a package with another package occur. In the meantime, in the present example, as described above, the lock pin 30 and the engageable recessed portion 70 are provided. Accordingly, while the storage box 14 is exposed to outside, fall and theft of the storage box 14 can be prevented.

Note that, here, one engageable recessed portion 70 is provided in one side wall 60S, but the number of engageable recessed portions 70 and the number of lock pins 30 corresponding to the engageable recessed portions 70 may be changed appropriately. For example, two or more engageable recessed portions 70 may be provided in one side wall 60S. At this time, the engageable recessed portions 70 and the lock pins 30 are arranged symmetrically in the front-rear direction. Hereby, even if the storage box 14 is inserted into the holding portion 20 in a reversed manner in the front-rear direction, the storage box 14 can be locked without any problem. As a result, the user who sets the storage box 14 to the holding portion 20 does not need to care about the orientation of the storage box 14 in the front-rear direction, thereby making it possible to simplify a setting operation.

In the meantime, in order to engage the lock pin 30 with the engageable recessed portion 70, it is necessary to set the storage box 14 at a position (hereinafter referred to as an "appropriate position") where the engageable recessed portion 70 directly faces the lock pin 30. In order to place the storage box 14 at such a position, some sort of positioning means may be provided in the storage box 14 and the support column 22. The positioning means may be a positioning mark 76 (see FIG. 5) attached to the storage box 14, for example. The positioning mark 76 is a mark provided in the storage box 14, and when the positioning mark 76 is aligned with part of the holding portion 20, the storage box 14 is guided to the appropriate position. In an example illustrated in FIG. 5, lines indicative of a front end and a rear end of the support column 22 in a state where the storage box 14 is set at the appropriate position are provided on the side wall 60S as the positioning mark 76. In this case, after the user places the storage box 14 on the support rails 28, the user should slide the storage box 14 to a position where the lines (the positioning marks 76) align with the front end and the rear end of the support column 22.

Figure 9A:
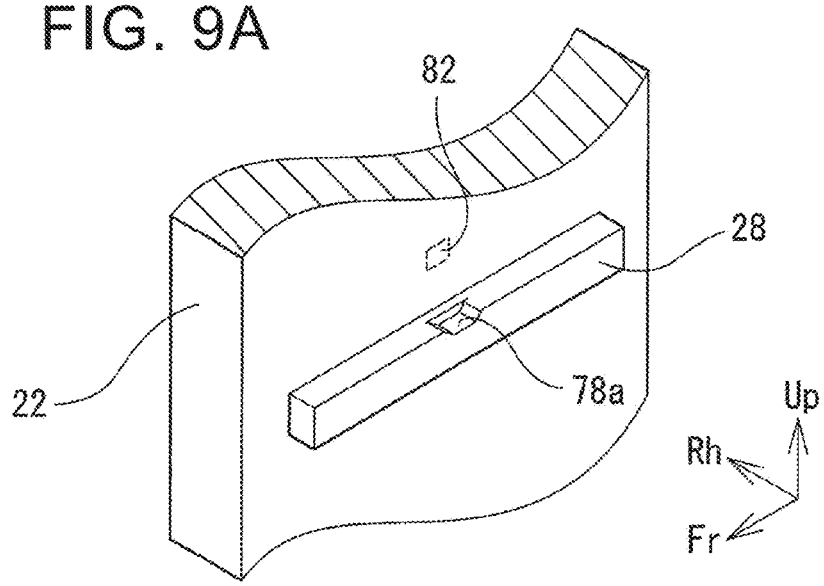
FIG. 9A is a perspective view illustrating an example of positioning means.

Further, as another form, the positioning means may include a positioning recessed portion 78a provided in one of the support column 22 and the storage box 14, and a positioning protrusion 78b provided in the other one of the support column 22 and the storage box 14. For example, as illustrated in FIG. 9A, the positioning recessed portion 78a may be provided on a top face of the support rail 28, and as illustrated in FIG. 5, the positioning protrusion 78b may be provided on the bottom face of the storage box 14. In this case, the positioning protrusion 78b is provided at a position where the positioning protrusion 78b is fitted into the positioning recessed portion 78a when the storage box 14 is set at the appropriate position. When the storage box 14 is set in the holding portion 20, the user inserts the storage box 14 into the holding portion 20 from the front side and pushes the storage box 14 to the deep side along the support rail 28. In this course, when the positioning protrusion 78b provided in the storage box 14 reaches a position right above the positioning recessed portion 78a provided in the support rail 28, the positioning protrusion 78b is fitted into the positioning recessed portion 78a by gravity. Hereby, a force necessary to push the storage box 14 to the deep side temporarily increases rapidly, so that the user can easily find that the storage box 14 has reached the appropriate position.

Figure 9B:
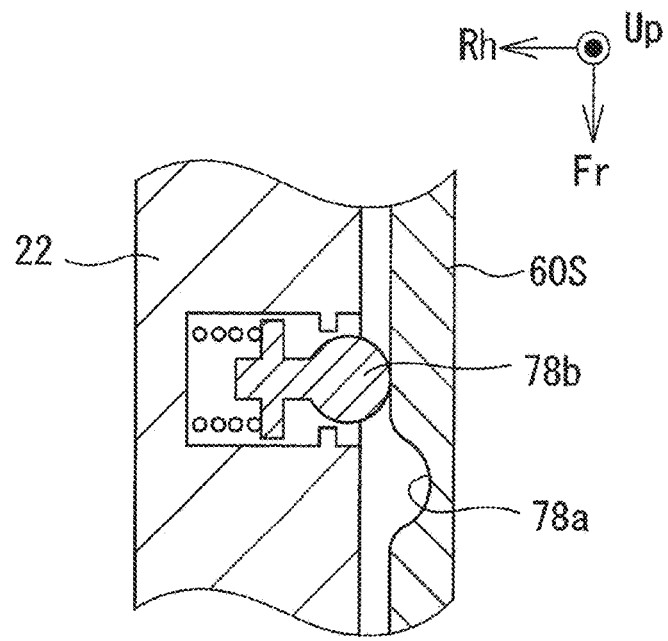
FIG. 9B is a sectional view illustrating another example of the positioning means.

Further, as another form, as illustrated in FIG. 9B, the positioning recessed portion 78a may be provided on a side face of the storage box 14, and the positioning protrusion 78b may be provided on the facing surface of the support column 22. In this case, the positioning protrusion 78b is biased by a spring toward a protruding direction. Even in this case, when the storage box 14 reaches the appropriate position, the positioning protrusion 78b is fitted into the positioning recessed portion 78a. Hereby, a force necessary to push the storage box 14 to the deep side temporarily increases rapidly, so that the user can easily find that the storage box 14 has reached the appropriate position.

Further, instead of or in addition to the positioning means, a positioning sensor 82 that can detect a state where the storage box 14 has reached the appropriate position may be provided. Such a positioning sensor 82 includes, for example, a hall element, a photoelectric sensor, and so on. The hall element is a sensor configured to output an electrical signal corresponding to a distance from a detection magnet. In a case where the hall element is used, a detection magnet 82a (see FIG. 6) may be fixed to a position on the side wall 60S of the storage box 14, the position being a position where the detection magnet 82a directly faces the hall element when the storage box 14 has reached the appropriate position. Further, the photoelectric sensor is a sensor configured to emit light and detect presence or absence of an opposed object or a change of a surface state based on reflection light of the light thus emitted. In a case where the photoelectric sensor is used, a detection surface 82*b* (see FIG. 6) having a reflectance different from that of its peripheral area may be provided at a position on the side wall 60S of the storage box 14, the position being a position where the detection surface 82*b* directly faces the photoelectric sensor when the storage box 14 has reached the appropriate position. The robot controller 34 should protrude the lock pin 30 at the timing when the positioning sensor 82 detects a state where the storage box 14 has reached the appropriate position.

Figure 10:
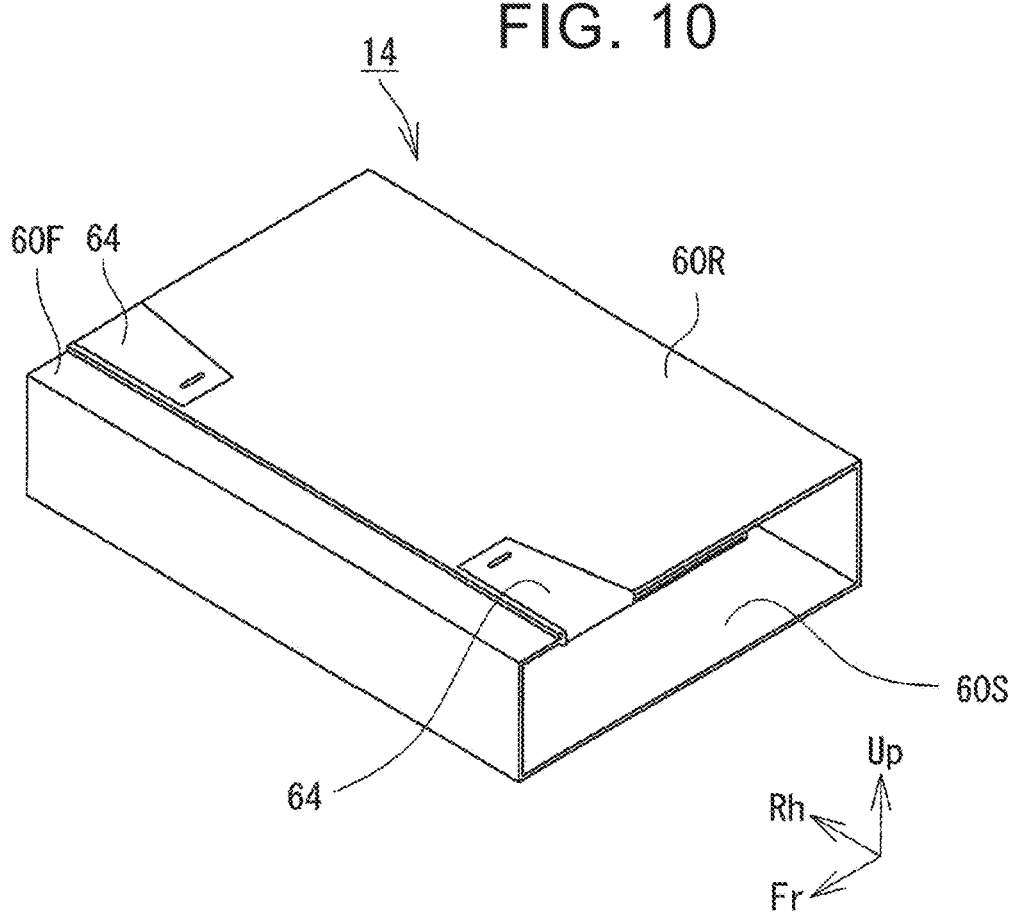
FIG. 10 is a perspective view of a storage box in a folded posture.
Figure 12:
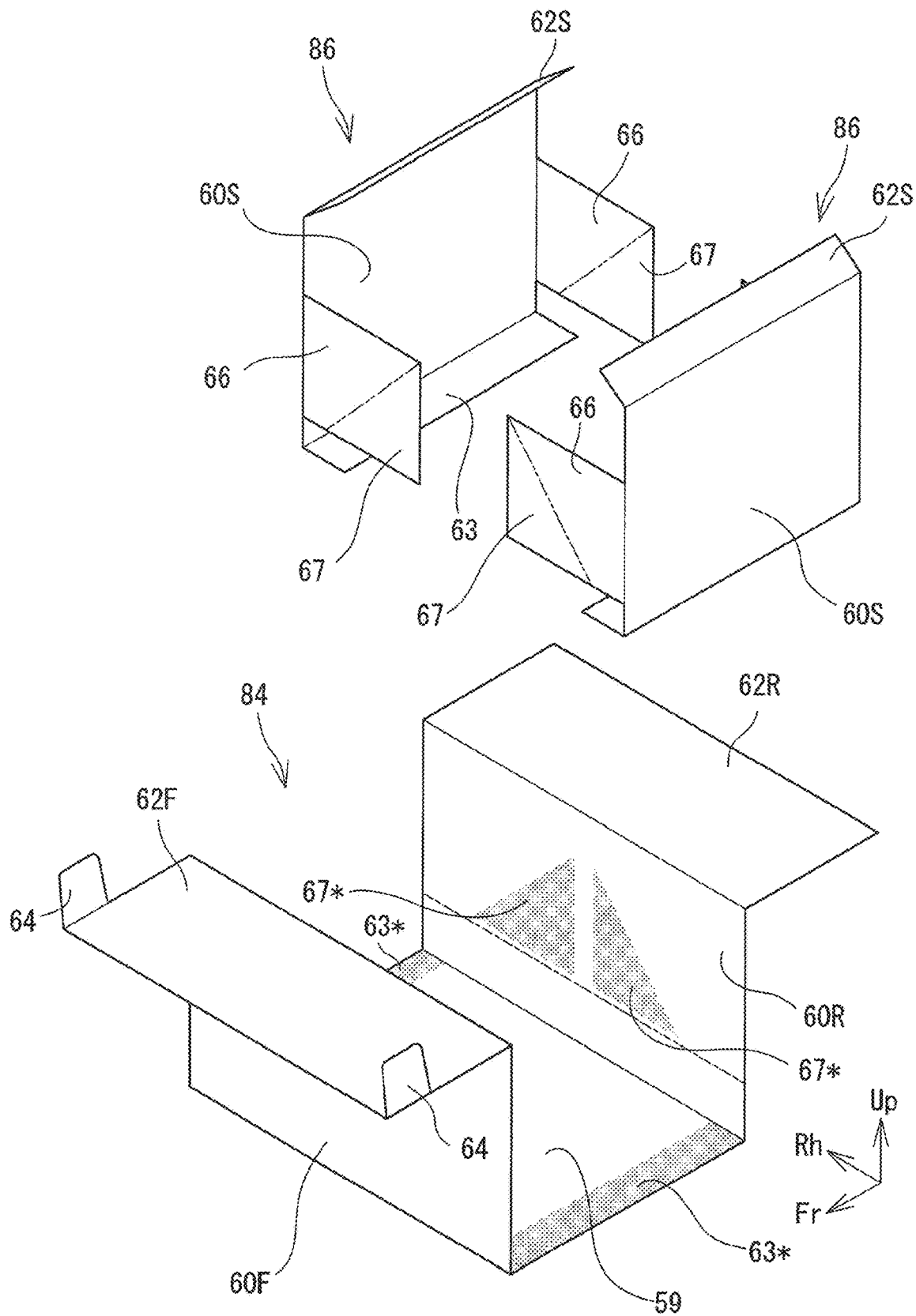
FIG. 12 is an exploded perspective view of the storage box.
Figure 13:
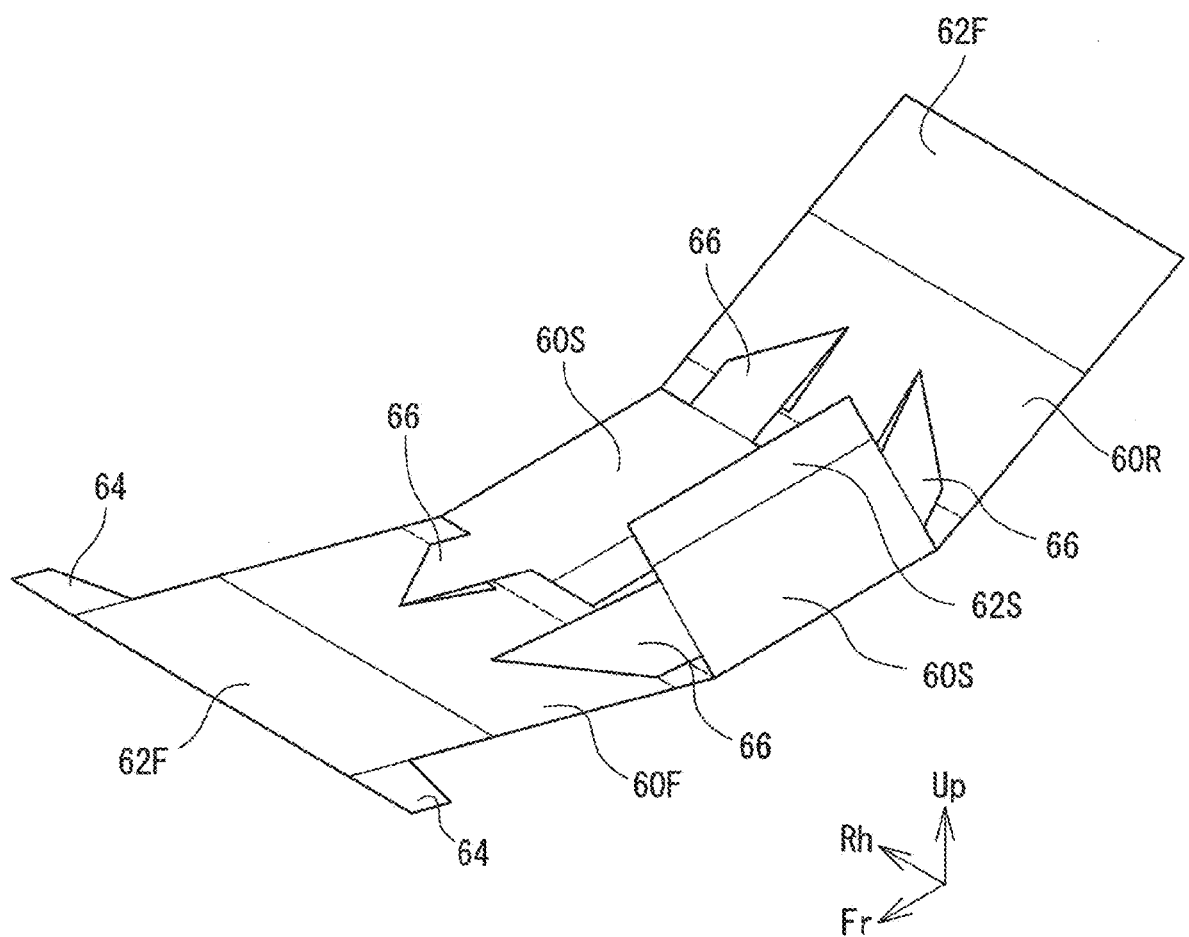
FIG. 13 is a perspective view of the storage box in the middle of folding.
Figure 14:
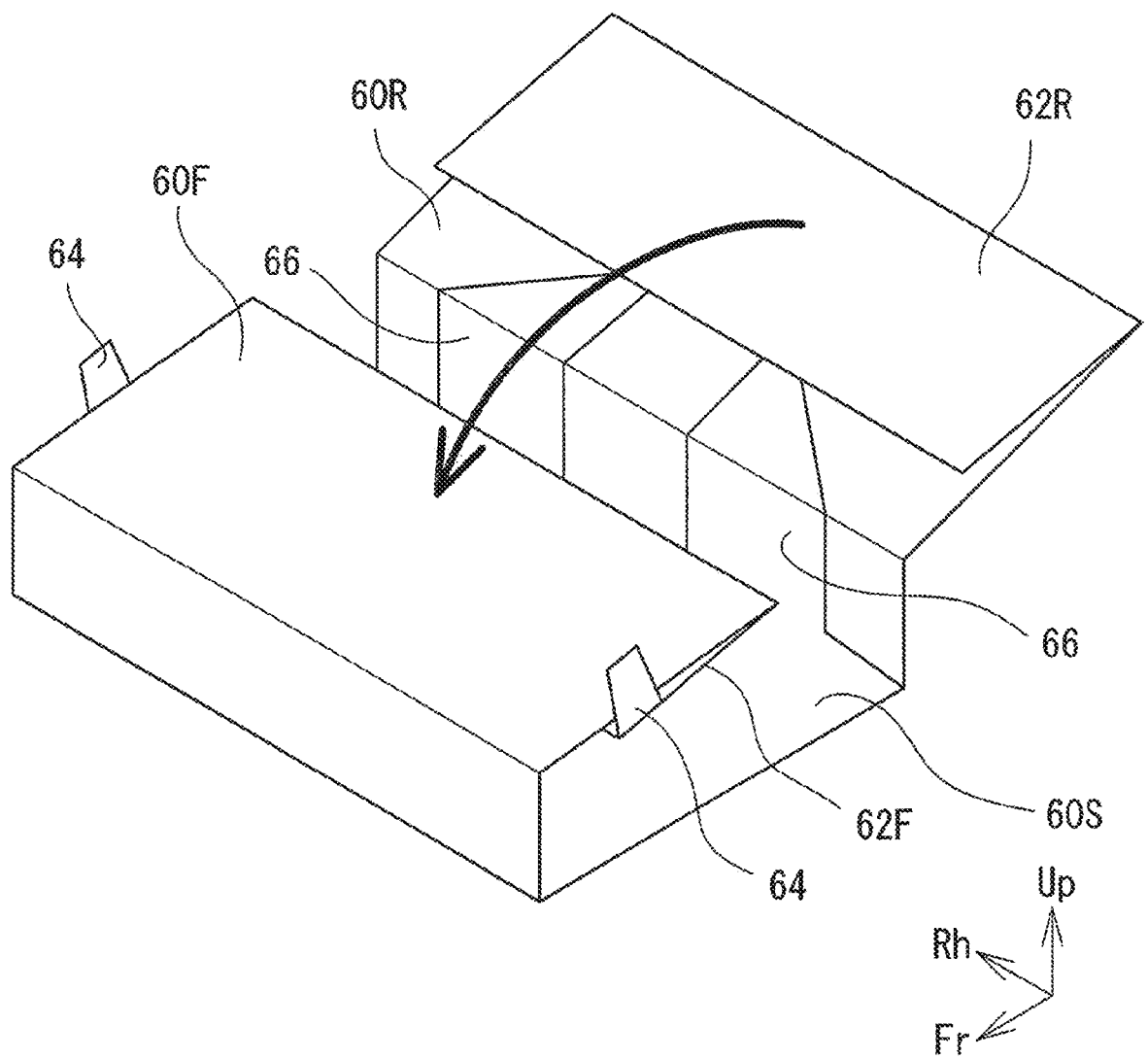
FIG. 14 is a perspective view of the storage box in the middle of folding.

In the meantime, as described repeatedly so far, the storage box 14 in the present example is collected after product conveyance, so that the storage box 14 is used repeatedly. In order to improve efficiency at the time when the storage box 14 is collected, the storage box 14 is foldable. That is, the storage box 14 is changeable between an assembled posture and a folded posture. The assembled posture is a posture in which the peripheral wall 60 (that is, the front wall 60F, the rear wall 60R, the side walls 60S) stands at a right angle from the bottom wall 59, and the folded posture is a posture in which at least part of the peripheral wall 60 and the cover 62 are parallel to the bottom wall 59. This will be described with reference to FIGS. 10 to 14. FIG. 10 is a perspective view of the storage box 14 in the folded posture. FIG. 11 is an exploded view of the storage box 14, and FIG. 12 is an exploded perspective view of the storage box 14. Further, FIGS. 13 and 14 are perspective views of the storage box 14 in the middle of folding.

As illustrated in FIG. 10, in the folded posture, the side walls 60S, the front wall 60F, and the rear wall 60R of the storage box 14 are folded such that they are at least partially parallel to the bottom wall 59. Hereby, the height dimension of the storage box 14 is largely reduced, thereby making it possible to increase the number of storage boxes 14 that can be collected and held by one product conveyance robot 12. Meanwhile, a plane size of the storage box 14 in the folded posture is the same as a plane size of the storage box 14 in the assembled posture. On this account, the storage box 14 in the folded posture can be held by being inserted into between the support columns 22, similarly to the storage box 14 in the assembled posture. Further, in the folded posture, the ear flaps 64 are folded back to be placed above the uppermost surface, that is, above the rear wall 60R in the example illustrated herein. At least part of the peripheral wall 60 folded to be parallel to the bottom wall 59 are sandwiched between the ear flaps 64 and the front cover flap 62F. In order to maintain the folded state of the ear flaps 64, a connection mechanism configured to connect the ear flaps 64 to the uppermost surface (the rear wall 60R in the example illustrated herein) may be provided. The connection mechanism may include, for example, a magnet, a snap, a hook-and-loop fastener, and the like. When such a connection mechanism is provided, the folded posture can be maintained surely.

The storage box 14 may be configured such that a plurality of rigid sheets is connected by a flexible sheet so that the storage box 14 can be easily folded while the storage box 14 is prevented from being damaged. In this case, the rigid sheet is constituted by a rigid material that cannot be easily cut and bent, e.g., metal, rigid plastic, carbon fiber reinforced plastic, and the like. The rigid sheet part is placed so as not to step over a fold line of the storage box 14. Further, the flexible sheet is constituted by a material that cannot be cut easily but can be easily bent, e.g., blade-proof fabric made of aramid fiber or the like, carbon cloth made of woven carbon fiber, and the like. Further, since the storage box 14 is conveyed in a state where the storage box 14 is exposed to outside, a material constituting the storage box 14 also has a waterproof property.

As illustrated in FIGS. 11, 12, the storage box 14 in the present example is constituted by one main piece 84 and two sub-pieces 86. The main piece 84 is a generally rectangular piece elongated in one direction and includes the front cover flap 62F, the front wall 60F, the bottom wall 59, the rear wall 60R, and the rear cover flap 62R arranged in line. The sub-piece 86 is a generally cross-shaped piece and includes the side wall 60S, the side cover flap 62S connected to the upper end of the side wall 60S, a first joining portion 63 connected to a lower end of the side wall 60S, and connection flaps 66 connected to both sides of the side wall 60S. Triangular second joining portions 67 are provided in respective distal ends of the connection flaps 66. The first joining portion 63 of the sub-piece 86 is joined to the bottom wall 59, and the second joining portions 67 of the connection flaps 66 are joined to the front wall 60F and the rear wall 60R, respectively. Hatching parts in FIG. 12 indicate joined parts 63*, 67* to which the first joining portions 63 and the second joining portions 67 are joined, respectively.

As illustrated in FIG. 13, at the time when the storage box 14 is folded, the front cover flap 62F and the rear cover flap 62R are pulled to a direction where the front cover flap 62F and the rear cover flap 62R are distanced from each other, so that the main piece 84 becomes flat. At this time, a part of the connection flap 66 other than the second joining portion 67 is folded back by 45 degrees. When the distal end of the connection flap 66 is folded by 45 degrees, the sub-piece 86 overlaps the main piece 84 in a flat manner.

After the main piece 84 and the sub-pieces 86 become flat, the front cover flap 62F and the rear cover flap 62R are then folded so that the front cover flap 62F is superimposed on the front wall 60F and the rear cover flap 62R is superimposed on the rear wall 60R as illustrated in FIG. 14. Then, the front wall 60F and the connection flaps 66 joined to the front wall 60F are folded so that the front wall 60F and the connection flaps 66 become parallel to the bottom wall 59. Then, as indicated by an arrow in FIG. 14, the rear wall 60R is also folded so that the rear cover flap 62R and the rear wall 60R are superimposed on the front wall 60F parallel to the bottom wall 59. Finally, the ear flaps 64 are folded so as to be superimposed on the rear wall 60R parallel to the bottom wall 59. Hereby, the storage box 14 has the folded posture. Note that the above description is made by taking the storage box 14 in the medium size as an example. In cases of the storage box 14 in other sizes, positions of fold lines and the size of the peripheral wall 60 should be changed appropriately in accordance with the size of the storage box 14.

Figure 15:
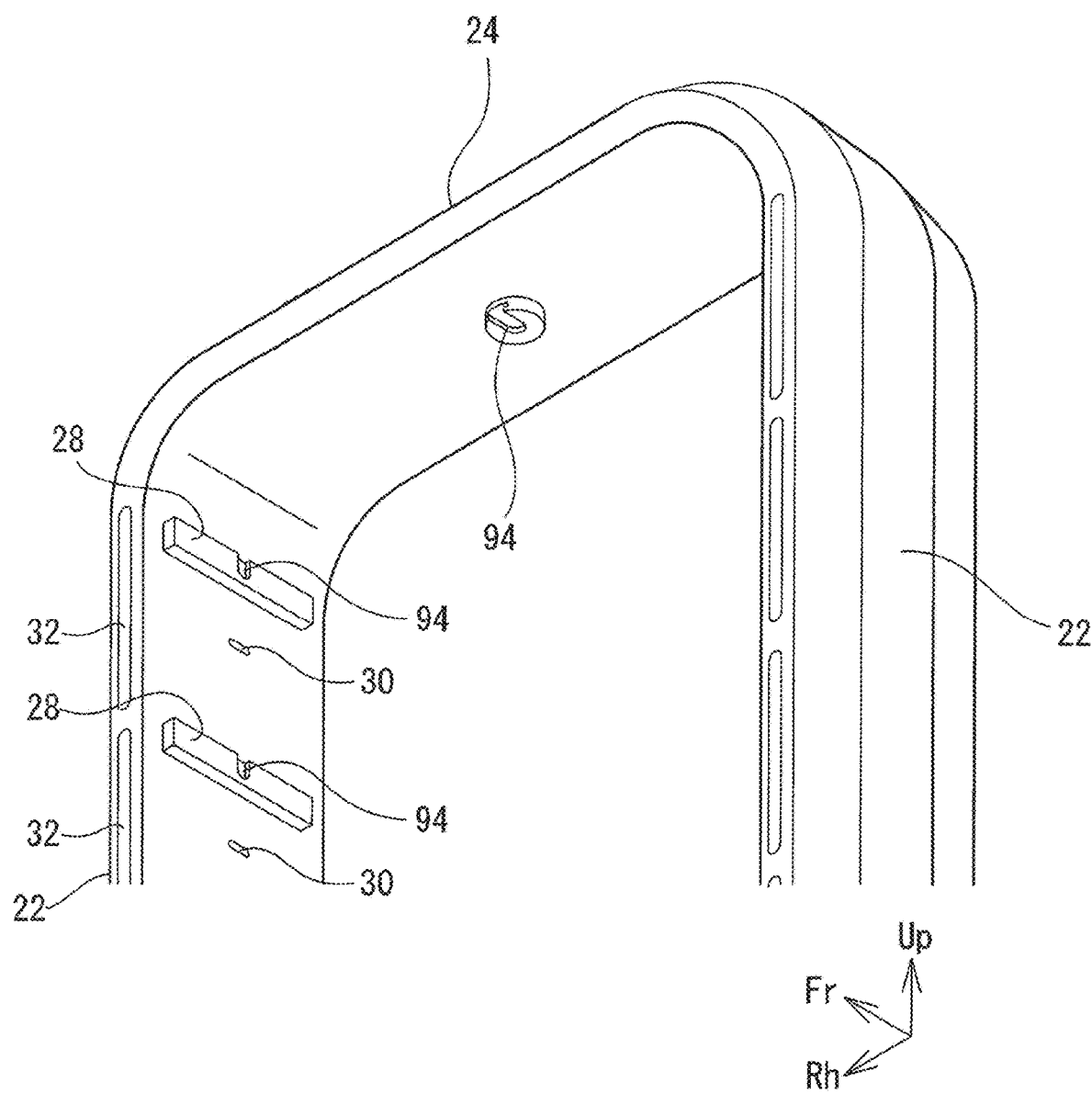
FIG. 15 is a partial perspective view of the holding portion of the product conveyance robot that can hold a container other than the storage box.
Figure 17:
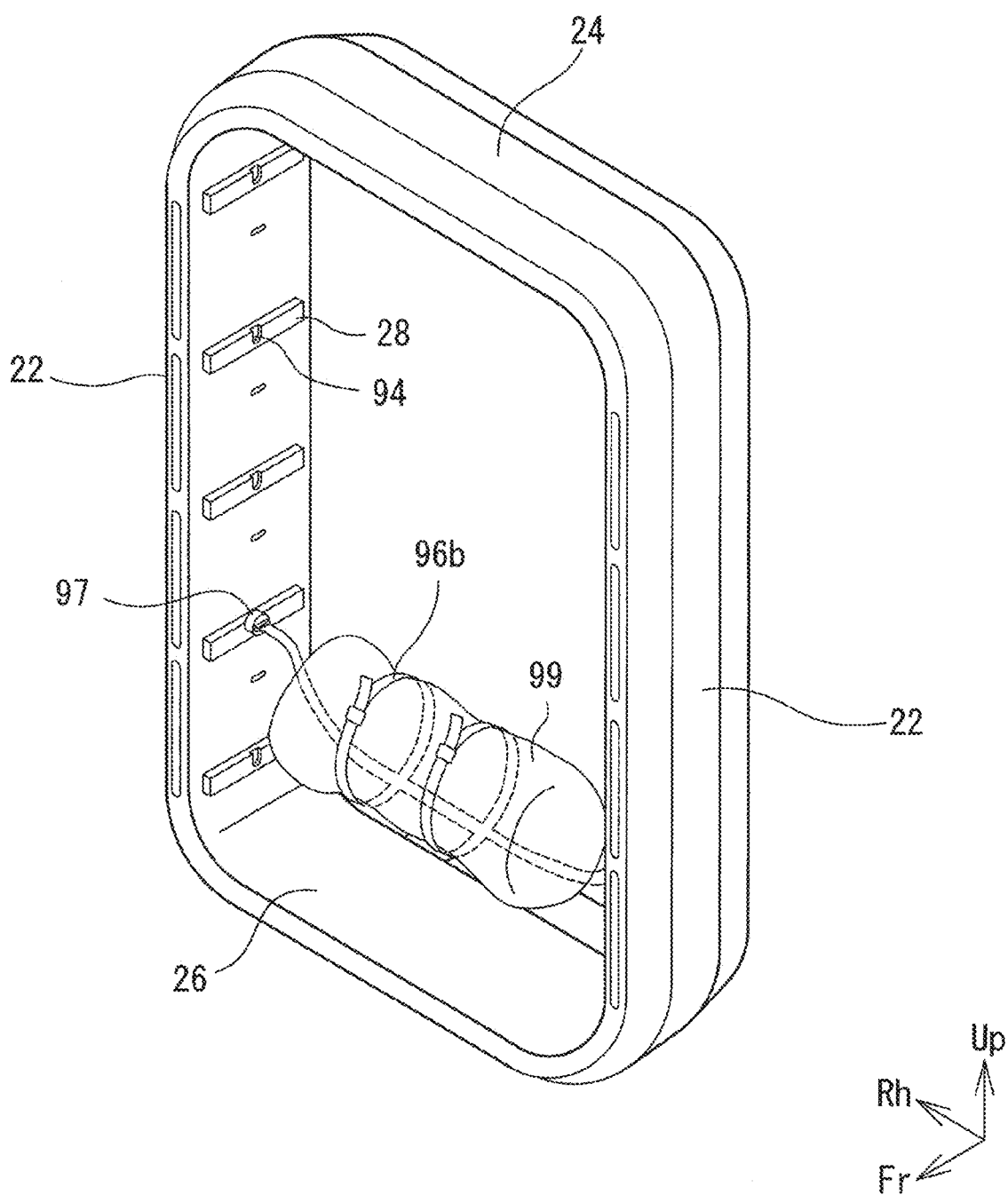
FIG. 17 is a perspective view illustrating a state where a band-type attachment is attached to the holding portion.

The description made so far deals with a case where a product is stored in the storage box 14 as an example. However, depending on the shape of the product, such a case might occur that the use of the storage box 14 is not suitable. In view of this, the following describes the product conveyance robot 12 that can hold a container other than the storage box 14 with reference to FIGS. 15 to 17. FIG. 15 is a partial perspective view of the holding portion 20 of the product conveyance robot 12. Further, FIG. 16 is a perspective view illustrating a state where a hanging-type attachment 96*a* is attached to the holding portion 20, and FIG. 17 is a perspective view illustrating a state where a band-type attachment 96*b* is attached to the holding portion 20.

The holding portion 20 of the product conveyance robot 12 is provided with a plurality of connected portions 94. A connecting portion 97 of an attachment 96 (described later) is connected to each of the connected portions 94 in an attachable and detachable manner. The configuration of the connection is not limited particularly, provided that the connecting portion 97 is freely attachable to and detachable from the connected portion 94. Accordingly, the connected portion 94 and the connecting portion 97 may be connected to each other by a magnetic buckle (e.g., FIDROCK (registered trademark) or the like) or may be connected to each other by threaded engagement or fitting. Further, in order to prevent unexpected detachment between the connected portion 94 and the connecting portion 97, a locking mechanism may be provided in the connected portion 94. The locking mechanism may be, for example, a pin or the like configured to protrude and engage with the connecting portion 97, like the lock pin 30.

The attachment 96 is a member configured to hold an option container 99 that cannot be easily supported by the support rails 28. As the attachment 96, a plurality of types of attachments may be prepared. The attachments 96 may include, for example, the hanging-type attachment 96a illustrated in FIG. 16 and the band-type attachment 96b illustrated in FIG. 17. The hanging-type attachment 96a hangs down the option container 99 such as a bag and holds the option container 99 downwardly. Further, the band-type attachment 96b holds the option container 99 in a tightly binding manner and includes a band and a buckle for maintaining a binding state of the band. Further, although not illustrated herein, the attachments 96 may include an attachment configured such that the connecting portion 97 is attached to a suitcase. Further, currently, a plastic carrying-handle holder has been widely known, and the carrying-handle holder is to be used such that the carrying-handle holder is hooked through a string packing a large bag or box that does not have a handle. The attachments 96 may include an attachment configured such that the connecting portion 97 is attached to such a carrying-handle holder.

In a case where the option container 99 is to be conveyed by the product conveyance robot 12, the user selects the attachment 96 suitable for the shape of the option container 99 from among the attachments 96 prepared in advance and attaches the attachment 96 to the connected portion 94 of the holding portion 20. Then, the option container 99 is attached to the attachment 96 attached to the holding portion 20. When the attachments 96 are prepared and the connected portion 94 to which the attachments 96 are attachable and detachable is provided in the holding portion 20, various types of option containers 99 can be also conveyed.

Note that the configurations described so far are just examples, and the other configurations may be changed, provided that the product conveyance robot 12 is provided with the lock pins 30 that can protrude and retract and the storage box 14 is provided with the engageable recessed portions 70 with which the lock pins 30 are engageable. For example, a support that supports the storage box 14 in the height direction is not limited to the support rail 28 that supports the storage box 14 from below and may be a hanging rail configured to hold the storage box 14 in a hanging manner. Further, in the present example, the storage box 14 is foldable, but the storage box 14 may not be foldable.

What is claimed is:

1. A product conveyance system comprising:
a storage box in which a product is stored; and
a product conveyance robot including a travel portion and a holding portion provided above the travel portion and configured to hold the storage box, wherein:
the holding portion includes a pair of support columns provided in a standing manner with an interval between the support columns in a width direction;
each of the support columns includes
one or more supports configured to support the storage box in a height direction, the storage box being placed between the support columns, and
one or more lock pins provided on a facing surface of the each of the support columns, the facing surface facing the other one of the support columns, the one or more lock pins being configured to protrude and retract in the width direction, the one or more lock pins being configured to engage with a part of the storage box supported by the supports when the one or more lock pins protrude from the facing surface, wherein:
the storage box includes a bottom wall, a peripheral wall provided in a standing manner from a periphery of the bottom wall, a cover configured to cover a takeout opening from above, the takeout opening being an upper end opening of the peripheral wall, and ear portions hanging downward from both ends of the cover in the width direction; and
engageable recessed portions with each of which a corresponding one of the lock pins engages are formed in the ear portions.

2. The product conveyance system according to claim 1, wherein:
the supports are support rails provided on the facing surfaces of the support columns and configured to slidably support the storage box from below;
the support rails are formed on the facing surfaces at regular intervals in the height direction;
the storage box includes a plurality of types of storage boxes having different height dimensions; and
a side recessed portion configured to avoid interference with the support rails is formed on a side wall of the storage box having a height dimension larger than an arrangement interval between the support rails.

3. The product conveyance system according to claim 1, further comprising a plurality of types of attachments configured to be freely attachable to and detachable from the holding portion, each of the attachments including a connecting portion and configured to hold an option container that is not supportable by the supports, wherein the holding portion is provided with one or more connected portions to which the connecting portion is connectable in a freely attachable and detachable manner.

4. The product conveyance system according to claim 3, wherein the attachments include at least one of a hanging-type attachment configured to hold the option container in a hanging manner and a band-type attachment configured to hold the option container in a tightly binding manner.

* * * * *